(12) United States Patent
Kwon et al.

(10) Patent No.: US 8,594,079 B2
(45) Date of Patent: Nov. 26, 2013

(54) NETWORK ARCHITECTURE WITH DISTRIBUTION OF PACKET SERVICES TO VARIOUS SWITCHES

(75) Inventors: James Kwon, San Jose, CA (US); Joseph Ammirato, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 97 days.

(21) Appl. No.: 13/076,327

(22) Filed: Mar. 30, 2011

(65) Prior Publication Data

US 2011/0243144 A1  Oct. 6, 2011

Related U.S. Application Data

(60) Provisional application No. 61/319,348, filed on Mar. 31, 2010, provisional application No. 61/325,040, filed on Apr. 16, 2010.

(51) Int. Cl.
*H04L 12/66* (2006.01)
(52) U.S. Cl.
USPC .......................................... 370/353; 370/400
(58) Field of Classification Search
None
See application file for complete search history.

(56) References Cited

U.S. PATENT DOCUMENTS

| | | | | |
|---|---|---|---|---|
| 5,859,718 A * | 1/1999 | Yamamoto et al. | ............. | 398/51 |
| 7,020,145 B1 * | 3/2006 | Symons et al. | ............... | 370/400 |
| 7,280,546 B1 * | 10/2007 | Sharma et al. | ............... | 370/401 |
| 7,283,519 B2 * | 10/2007 | Girard | ........................... | 370/353 |
| 2009/0037470 A1 * | 2/2009 | Schmidt | ..................... | 707/104.1 |
| 2011/0243142 A1 * | 10/2011 | Kwon et al. | .................. | 370/400 |
| 2011/0243143 A1 * | 10/2011 | Kwon et al. | .................. | 370/400 |
| 2011/0243144 A1 * | 10/2011 | Kwon et al. | .................. | 370/400 |
| 2011/0246899 A1 * | 10/2011 | Kwon et al. | .................. | 715/736 |

* cited by examiner

*Primary Examiner* — Robert Wilson
(74) *Attorney, Agent, or Firm* — Wong, Cabello, Lutsch, Rutherford & Brucculeri, L.L.P.

(57) ABSTRACT

Virtual machine environments are provided in the switches that form a network, with the virtual machines executing network services previously performed by dedicated appliances. The virtual machines can be executed on a single multi-core processor in combination with normal switch functions or on dedicated services processor boards. Packet processors analyze incoming packets and add a services tag containing services entries to any packets. Each switch reviews the services tag and performs any network services resident on that switch. This allows services to be deployed at the optimal locations in the network. The network services may be deployed by use of drag and drop operations. A topology view is presented, along with network services that may be deployed. Services may be selected and dragged to a single switch or multiple switches. The management tool deploys the network services software, with virtual machines being instantiated on the switches as needed.

10 Claims, 26 Drawing Sheets

NETWORK ARCHITECTURE WITH DISTRIBUTION OF PACKET SERVICES TO VARIOUS SWITCHES

CROSS REFERENCE TO RELATED APPLICATIONS

This application claims the benefit under 35 U.S.C. §119 (e) of U.S. Provisional Patent Application Ser. Nos. 61/319, 348, entitled "NETWORK SWITCHES WITH VIRTUAL MACHINES AND SIMPLIFIED DISTRIBUTION," filed Mar. 31, 2010 and 61/325,040, entitled "NETWORK SWITCHES WITH VIRTUAL MACHINES AND SIMPLIFIED DISTRIBUTION," filed Apr. 16, 2010, which are hereby incorporated by reference.

This application is related to U.S. patent application Ser. Nos. 13/076,302, entitled "Simplified Distribution of Software to Networked Devices"; 13/076,310, entitled "Ingress and Egress Switch which Determines Services Related to an Incoming Packet"; and 13/076,321, entitled "Switch with Packet Services Processing", all by the current inventors and filed on the same date as the current application and all of which are hereby incorporated by reference.

BACKGROUND OF THE INVENTION

1. Field of the Invention

The invention relates to network switches and management tools, and more particularly to switches and management tools for executing and deploying network services.

2. Description of the Related Art

One problem that exists today in an enterprise environment is that a number of dedicated appliances are necessary to perform various network functions, such as wireless LAN control, unified communications, encryption and the like. This is problematic because it represents additional devices to purchase and maintain and also increases routing and trip times for packets as they must traverse additional links. This is shown graphically in FIG. 1. FIG. 1 illustrates a general network architecture 100 for an enterprise with branch offices and various campuses. A campus core network 102 includes a plurality of interconnected core switches 104. The core switches 104 are connected to a data center (not shown). A router 106 is connected to the core switches 104. The router 106 connects through a wide area network (WAN) 108 to a branch office network no. The branch office network no includes a unified device 112 which operates as a router, virtual private network interface, unified communication interface, switch and PBX. Therefore telephones 114, computers 116 and wireless access points 118 are connected to the unified device 112. A campus aggregation network 120 is connected to the campus core network 102. The campus aggregation network 120 includes switches 122 and 124. The switches 122 and 124 are connected to the core network switches 104. Connected to the switch 124 in FIG. 1 is a WLAN controller 126, a call manager 128, a network access controller 130, a unified threat management (UTM) device 132 and a network behavioral analysis (NBA) device 134. These are the various dedicated appliances for the relative type of traffic. For example, the WLAN controller 126 is used to manage wireless access control into the network, the call manager 128 handles unified communications, and the UTM 132 handles various threats and the like. A large campus access network 140 includes a series of stackable switches 142 which are connected to the switches 122 and 124. Connected to the stackable switches 142 are telephones 144, computers 146 and wireless access points 148. A medium campus access network 150 includes a series of switches 152 and 154 which are connected to the switches 122 and 124. Connected to the switches 152 and 154 are telephones 156, computers 158 and wireless access points 160. A small campus access network 170 includes a switch 172 which is connected to the switches 122 and 124. A series of computers 174 are shown connected to switch 172. This is a typical enterprise network configuration with the various exemplary pieces. It can be seen that to handle the wireless access traffic for the various wireless access points such as 148 and 160, network traffic would be transferred through the relevant switches such as 142, 154 and 124 to the WLAN controller 126 for control. The network traffic would then transfer from the WLAN controller 126 back to the switch 124 to the core switches 104. Similarly, unified communications such as call setups would have to travel from the telephones 144 or 156 to the call manager 128 through the switches 153, 154, 142 and 124 and then back to the network as required. This illustrates the multiple routes and back-and-forth that must occur with the dedicated appliances. It is desirable to remove these special-purpose appliances.

SUMMARY OF THE INVENTION

In preferred embodiments according to the present invention, virtual machine environments are provided in the switches that form a network. The virtual machines are used to execute network services previously performed by dedicated appliances. The virtual machines can be executed on a single multi-core processor in combination with normal switch functions or on services processor boards added for the purpose of executing the services. The packet processors in the switch ports analyze incoming packets and add a services tag containing services entries to any packets requiring available network services. Each switch reviews the services tag and performs any network services resident on that switch, removing the services entry for that service. This allows services to be deployed at the optimal locations in the network, such as the edges or the core, rather than requiring multiple traverses of links to use dedicated appliances. The network services may be deployed to the switches by use of a graphical user interface and drag and drop operations. A topology view of the network is presented, along with network services that may be deployed. Multiple services may be selected and dragged to a single switch or multiple switches may be selected and then the services selected and dragged to the selected switches. The management tool deploys the network services software, with virtual machines being instantiated on the switches as needed to support the network services.

DETAILED DESCRIPTION

In embodiments according to the preferred invention, a conventional switch is utilized with software changes. For this invention, the term switches encompasses data traffic from Layers 1 through 7 in the conventional Open Systems Interconnection (OSI) model as defined by the International Organization for Standardization (ISO), along with the ITU-T. Two alternate embodiments are provided in FIGS. 2 and 3.

Figure 2:
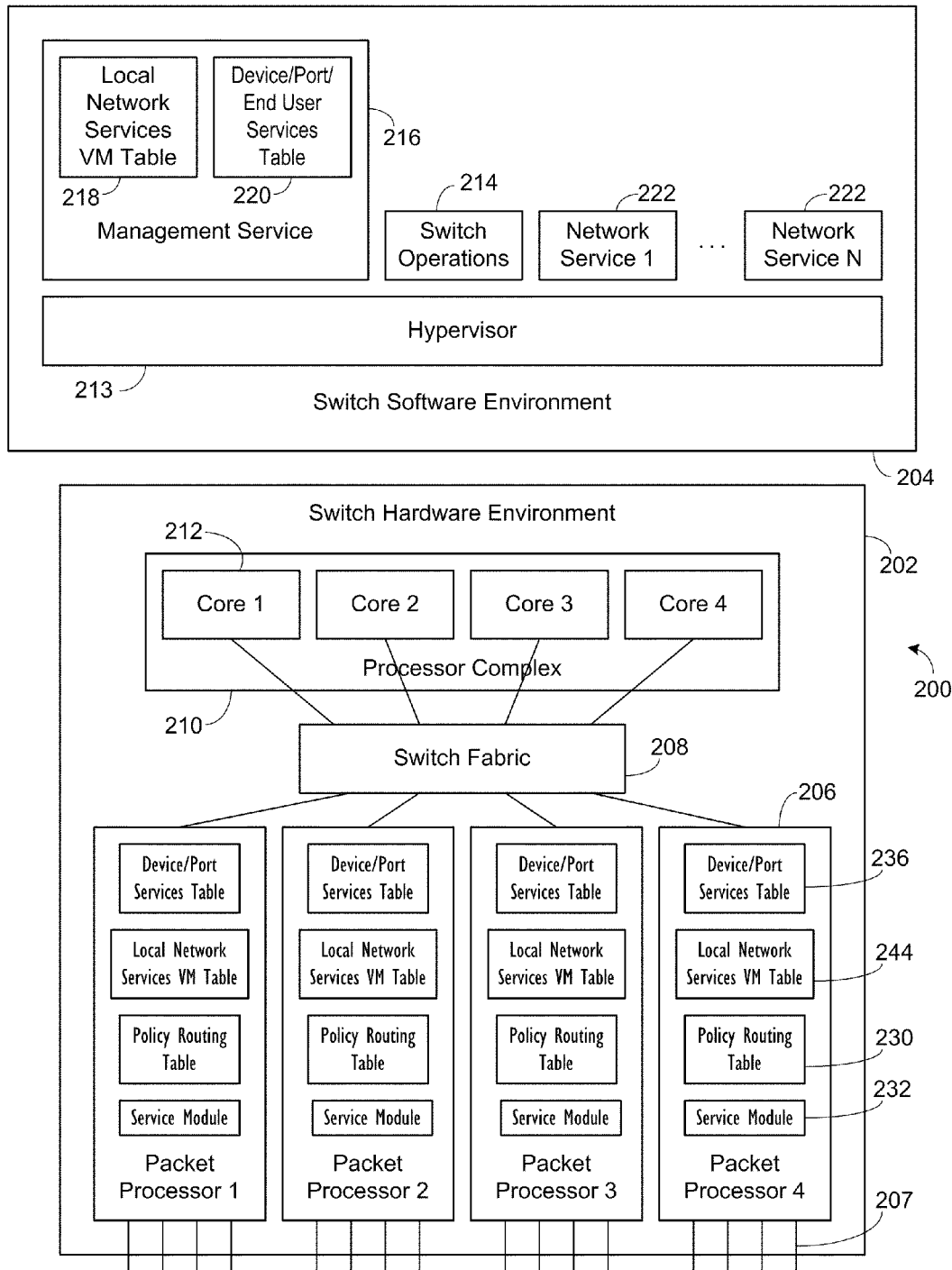
FIG. 2 is a block diagram of a first embodiment of the software and hardware environments of a switch according to the present invention.

In the first embodiment of FIG. 2, a switch 200 is illustrated as having hardware 202 and software 204 environments. Discussing first the hardware environment 202, a plurality of packet processors 206 are illustrated. The packet processors 206 include a plurality of network ports 207 for receiving network communications. The packet processors 206 are connected to a switch fabric 208. The switch fabric 208 provides the basic switching operations for the switch 200. A processor complex 210 is connected to the switch fabric 208.

The processor complex 210 in the embodiment is illustrated as having four cores 212. This is one preferred embodiment. In alternate embodiments the processor complex 210 can have more cores or fewer cores or can consist of multiple processors each having single or multiple cores.

The software environment 204 includes a hypervisor 212 to operate a series of virtual machines (VMs) as known to those skilled in the art. The first virtual machine in the illustrated embodiment is conventional switch operations virtual machine 214. These are the operations performed in a conventional prior art switch and generally deal with the operations of the switch fabric 208, the packet processors 206 and the basic routing functions of the switch 200. According to the preferred embodiment there are additional virtual machines operating in the switch 200. The first of these is a management service virtual machine 216. The management service VM 216 manages the network services being provided by the particular switch 200 and other switches in the network. The management service VM 216 includes a local network services VM table 218 to list the local network services operating on the particular switch 200. A device/ports/end-user services table 220 is provided in the management service VM 216 to cooperate with the packet processors 206 to provide proper tagging of received packets to allow operation by the various network services modules. Also illustrated in the embodiment of FIG. 2 are a plurality of network service virtual machines 222. These are the VMs that perform the various network services that have been distributed to the switches according to the present invention. These network service VMs 222 perform the functions that would have previously required dedicated appliances. The operation of the network service virtual machines 222 is described below in more detail.

To provide hardware support for the provision of the network services, the packet processors 206 include additional capabilities from conventional packet processors. Each packet processor 206 includes a conventional policy routing table 230 to provide conventional L2 VLAN or L3 routing. In addition, the packet processor 206 analyzes the incoming packet and determines by reference to a local copy of the device/port services table 236 if the incoming packet is to have any network services performed on the particular packet. If so, a services tag, to be described in more detail below, is placed into the packet. A service module 232 examines the services tag and a local network services VM table 234 to determine if any network services present in the switch 200 are to be provided on the particular packet of interest. If one or more of the needed services is operational on the switch 200, the service module 232 directs that the packet be routed to the proper virtual machine or machines running on the processor complex 210 to provide the service or services. When the network service is completed, the network services VM 222 removes its entry from the services tag and forwards the packet to the next network service VM 222 or to the switch fabric 208 for routing from the switch 200.

The processors utilized in current switches are sufficiently powerful that the hypervisor and the multiple VM environment does not exhaust their capabilities, allowing operation of the network services in the virtual machines. In addition, embodiments according to the present invention can enable network service virtual machines to be dynamically created in desired switches in the network in order to provide additional services capacity as and where needed, such as due to failure of another switch, reconfiguration of the network, additional traffic in the network or deployment of new network services software as described below.

Figure 3:
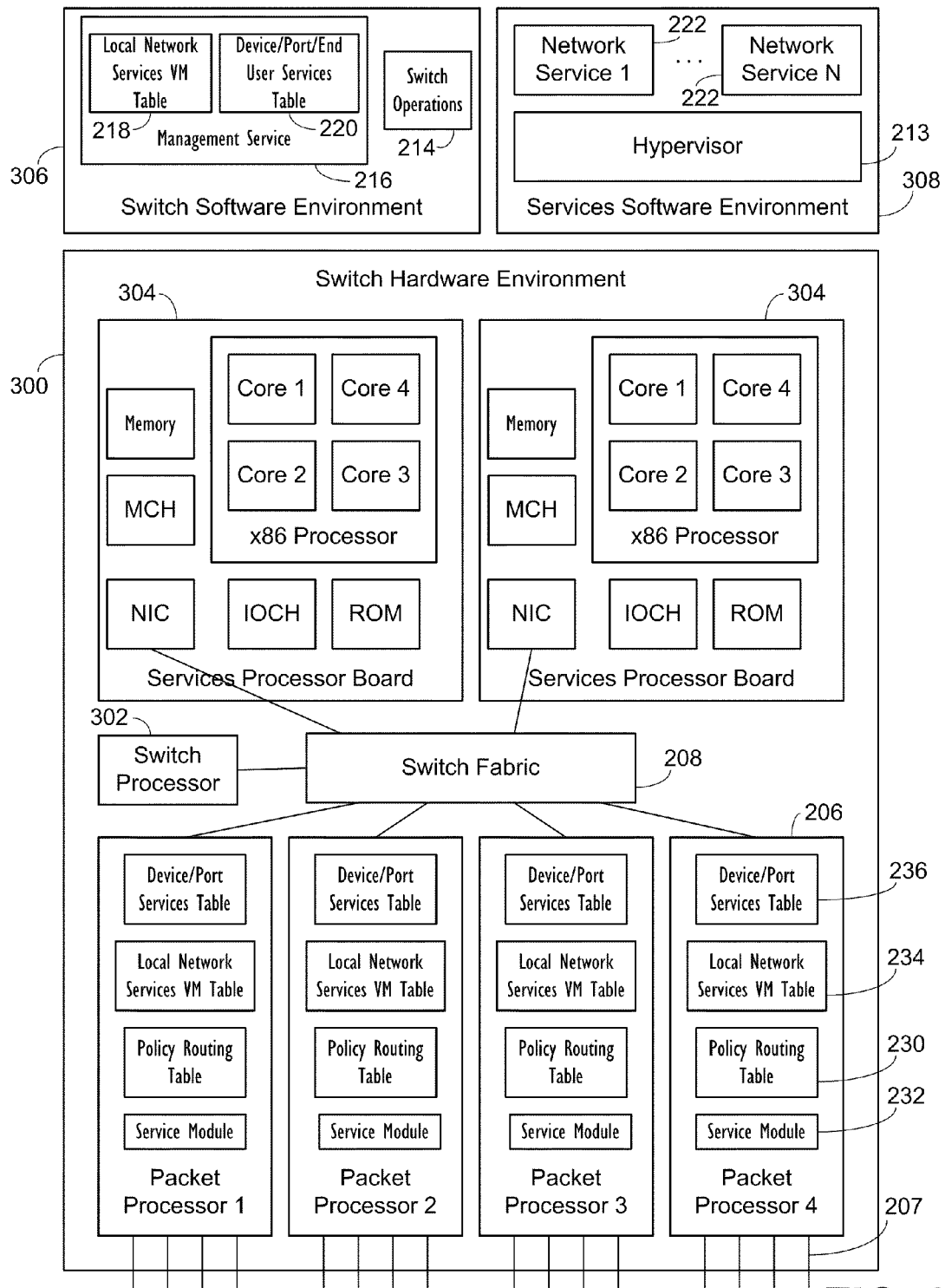
FIG. 3 is a block diagram of a second embodiment of the software and hardware environments of a switch according to the present invention.

In the second embodiment of FIG. 3, the processor complex 210 is replaced by a switch processor 302 and one or more services processor boards 304. The switch processor 302 operates essentially conventionally except the management service 216 is executing on the switch processor 302, though not as a virtual machine but as a conventional task. The network services are executed on the separate services processor board or boards 304, which are connected to the switch fabric 208. In this second embodiment, a processor, preferably an x86 processor rather than the more conventional PowerPC processor used for switch management, executes the hypervisor 212 and the virtual machines 222 which provide the local network services. As in the first embodiment, virtual machines 222 can be created dynamically. The second embodiment has the additional cost of the services processor boards 304 but generally is able to execute more or more complicated network services then first embodiment due to the dedicated capability of the services processor boards 304 and can generally execute network services software intended to operate on x86 processors.

Figure 4:
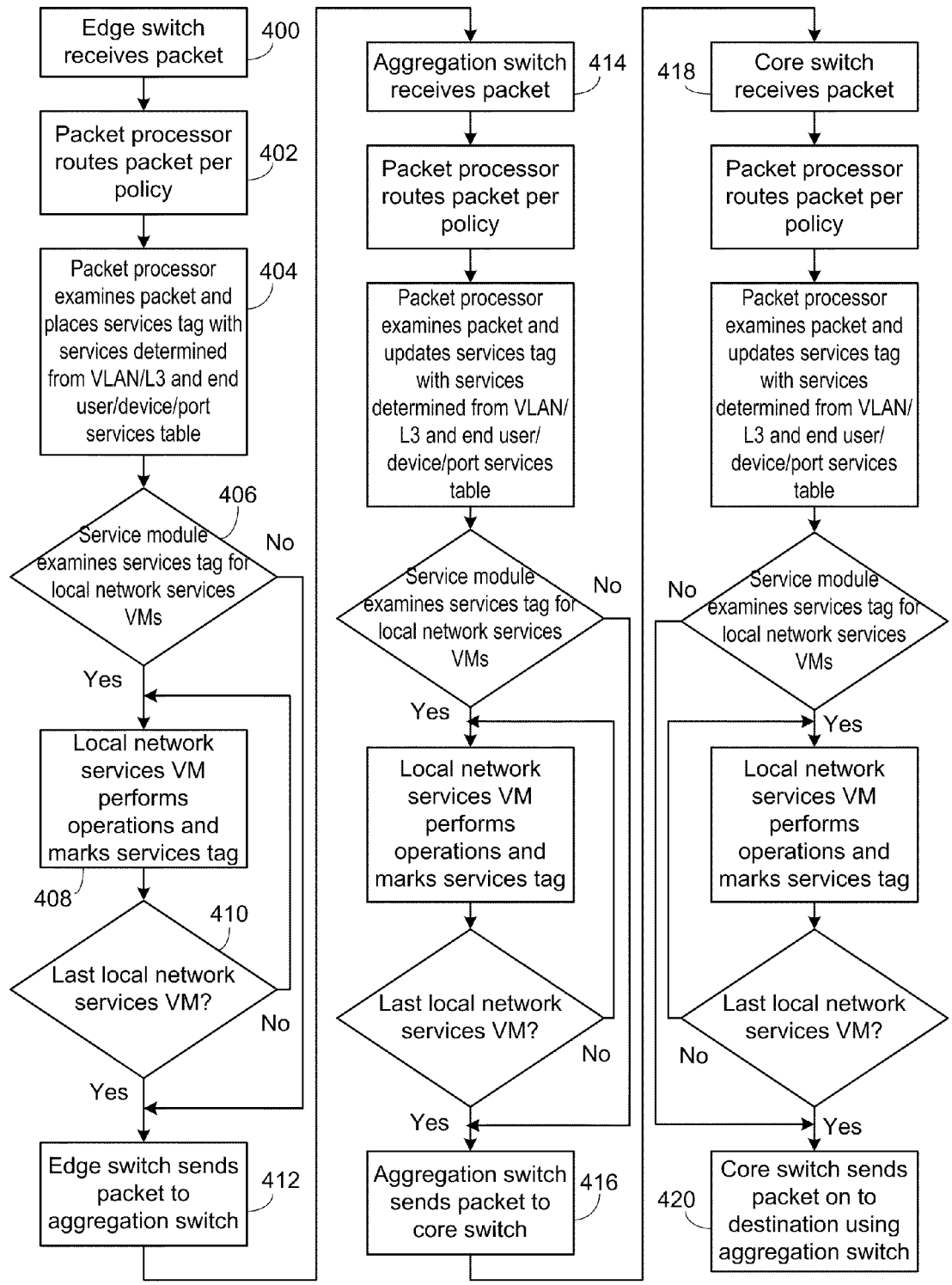
FIG. 4 is a flowchart of switch operations according to the present invention.

As shown in FIG. 4, in operation, in step 400 an edge switch receives the packet or frame. A packet processor 206 in the edge switch performs policy-based routing, such as L2 VLAN or L3 routing in step 402. The packet processor 306 also examines the packet and places a services tag, which indicates the particular services, into the packet in step 404. The services are determined by reviewing the relevant information, such as VLAN or L3 information, and the device/port/end user services table 236. The services tag preferably includes an identifier to indicate the various types of services and service levels and so on as necessary for the particular packet, as described in more detail below. The services tag is in addition to or in replacement of selected tags that are commonly present in Ethernet packets. The packet is then provided in step 406 to the service module 232 in the packet processor 206 to examine the services tag to see if any of the local network service virtual machines are indicated. If so, then the packet is routed to the particular virtual machine or machines that are indicated, which then in step 408 perform their operations. Preferably when each network services virtual machine completes its operations, it removes its indication from the services tag to indicate that it has performed its operations and they are not to be re-executed on the next particular switch, unless of course it is appropriate. A loop of passing through virtual machines in the local switch continues until all local network services virtual machines that are appropriate have been utilized is done in step 410. If none of the local network services virtual machines are appropriate or the last one has been utilized, in step 412 the edge switch then forwards the packet to an aggregation switch in a typical large enterprise environment, such as in FIG. 1 or 5.

The aggregation switch receives the packet in step 414 and then performs the same basic operations as the edge switch, though the services tag may be updated. When all the virtual machines have completed operation or none are present, the aggregation switch in step 416 sends the packet to a core switch.

The core switch receives a packet in step 418 and then performs the same basic operations as the aggregation switch. When all of the virtual machines have completed their operations or if none are present, the core switch in step 420 sends the packet onto the destination using an aggregation switch or to the data center. The aggregation and edge switches on the path out from the core will operate similarly and utilize any relevant local network services virtual machines.

Figure 1:
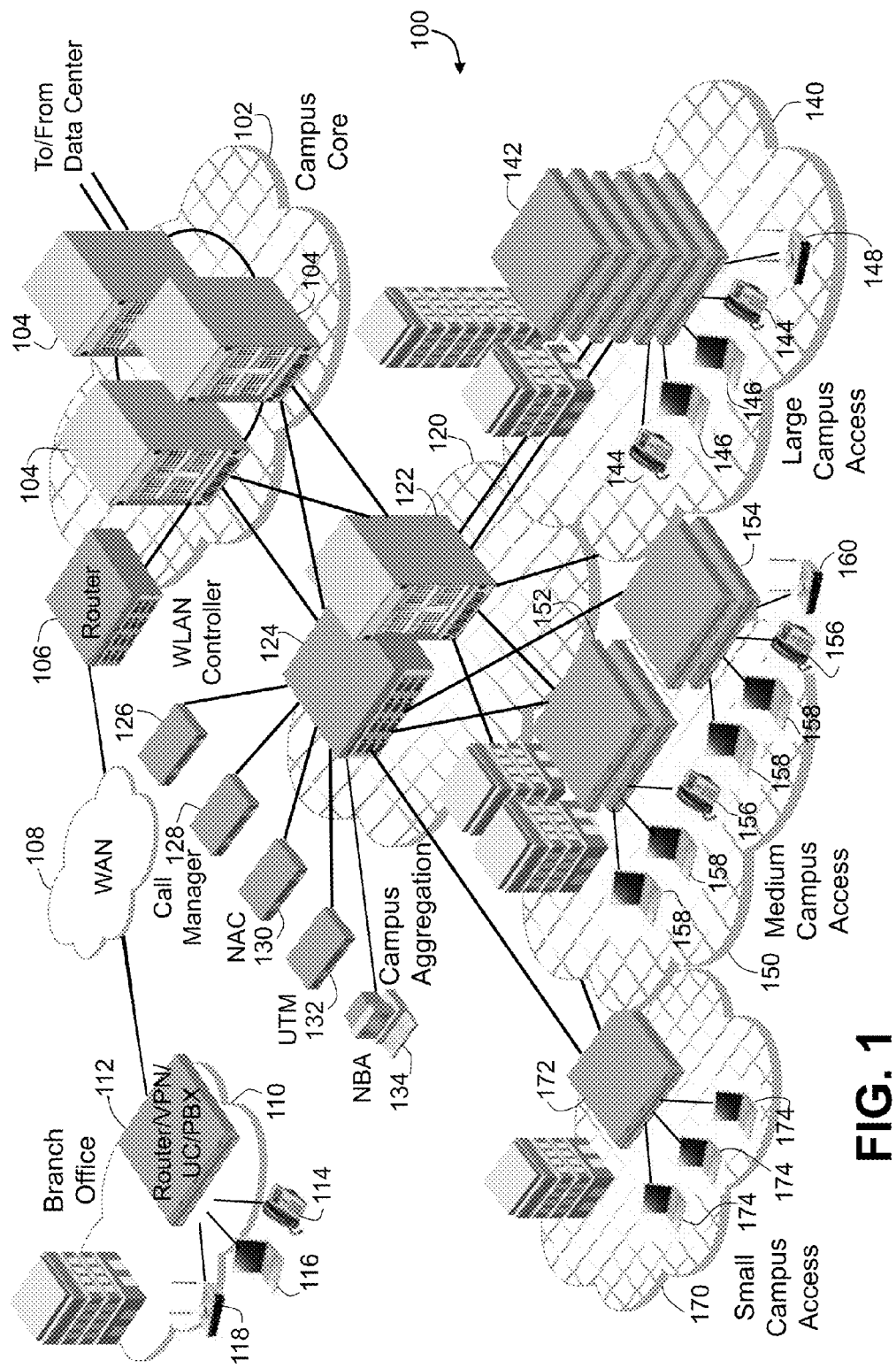
FIG. 1 is a block diagram of a prior art enterprise network architecture and devices.
Figure 5:
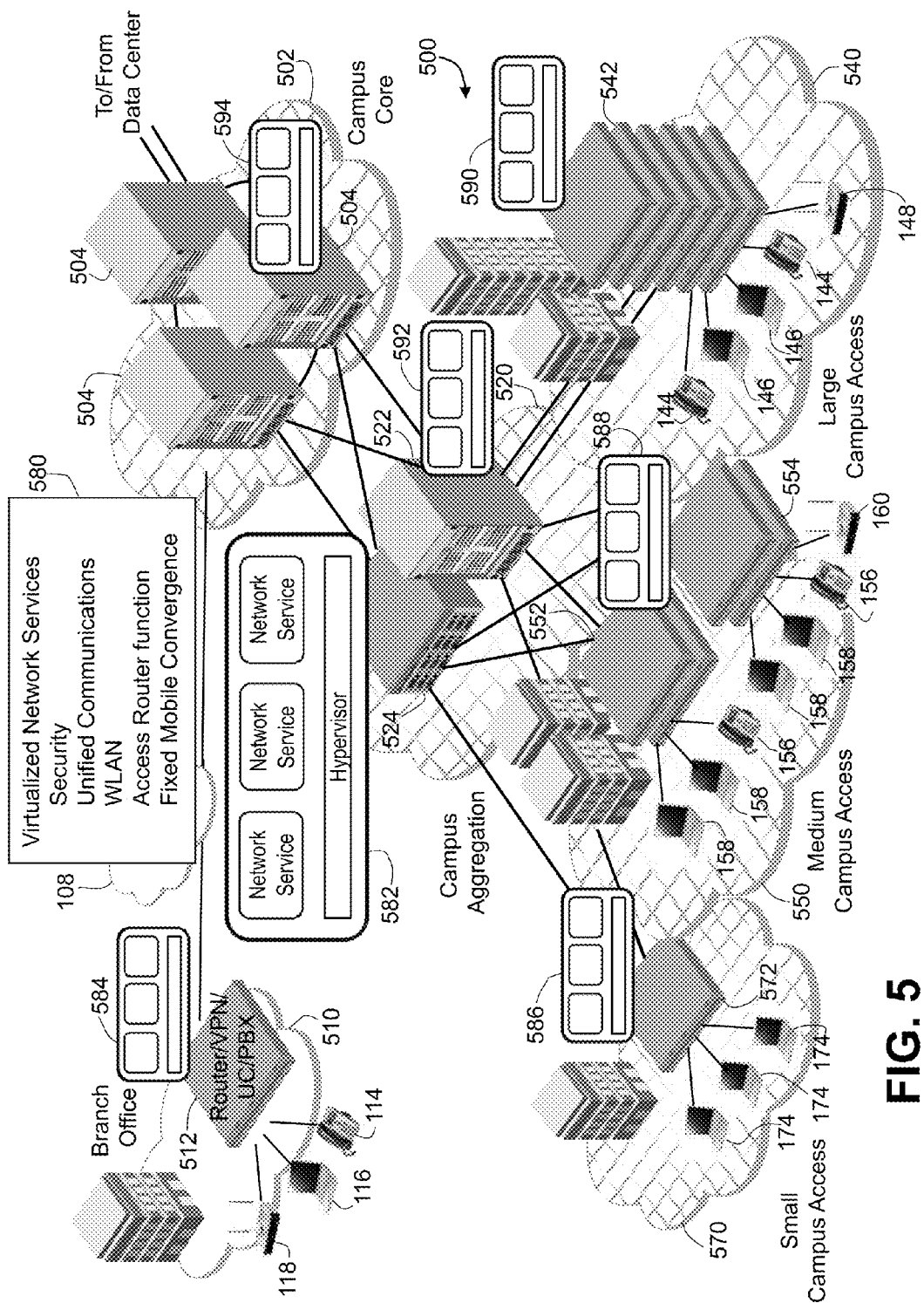
FIG. 5 is a block diagram of an enterprise network architecture according to the present invention illustrating exemplary virtual machines and the services that need to be performed.
Figure 6:
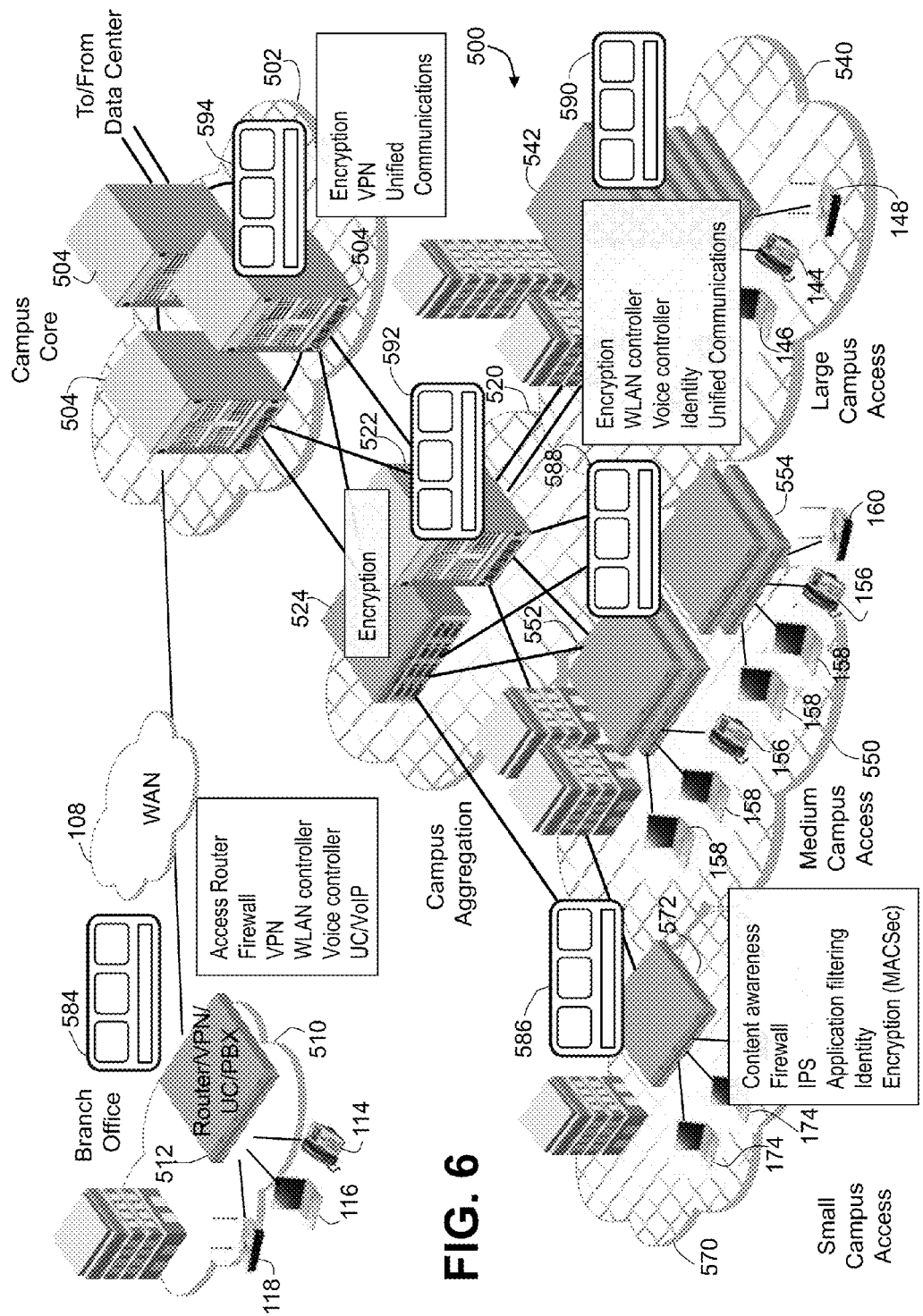
FIG. 6 is the embodiment of FIG. 5 with the tasks distributed to the relevant switches in the network.
Figure 6A:
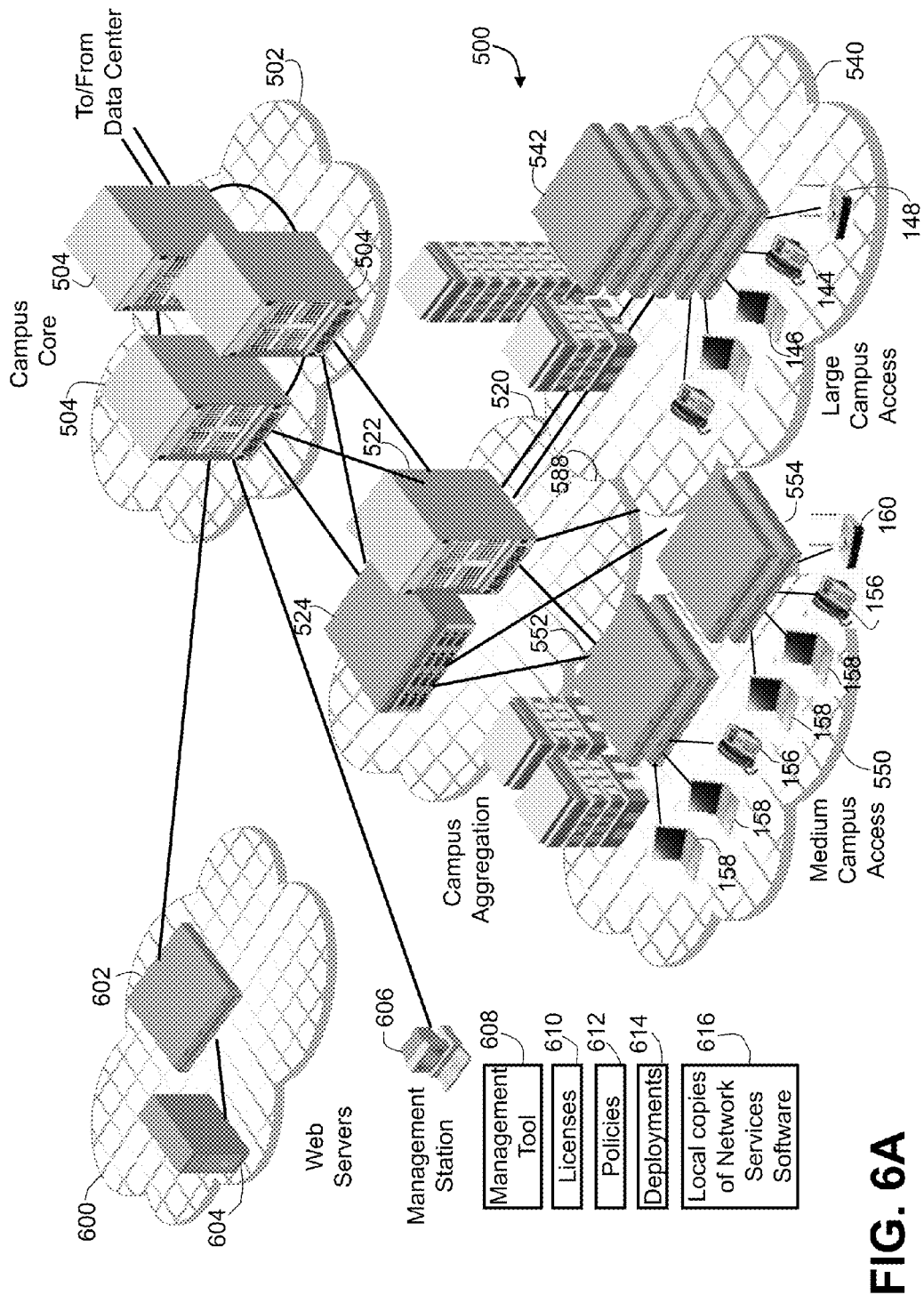
FIG. 6A is a block diagram of a network for distributing network services software according to the present invention.

Referring to FIGS. 5 and 6, a network 500 similar to that of FIG. 1 is shown except that the switches and devices are adapted to operate according to the present invention and the specialized appliances have been removed. Like devices from FIG. 1 are numbered as in FIG. 1. Similar devices that operate according to the present invention are renumbered with the leading digit of five to indicate the same general function but with the addition of virtualized network services according to the present invention. Exemplary virtualized network services are shown in a list 580. These network services include security, unified communications, WLAN, access router functions and fixed mobile convergence functions. A VM block 582 is illustrated to show the hypervisor and network services VMs as described in FIGS. 2 and 3. The VM blocks are provided next to appropriate switches and devices. For example, VM block 584 is adjacent to the router/VPN device 512, VM block 586 is adjacent to the switch 572, VM block 588 is adjacent switches five 552 and 554, VM block 590 is adjacent switches 542, VM block 592 is adjacent switches 522 and 524 and VM block 594 is adjacent switches 504. The virtual machines in the associated block execute on all of the indicated switch groups. For example, the VM block 588 is executing on both switches 552 and 554. FIG. 6 provides a detailed breakdown of exemplary network services deployed to each of the virtual machines. VM block 584 includes services that include access router, firewall, VPN, WLAN controller, voice controller and unified communications/VoIP. VM block 586 executes network services such as content awareness, firewall, intrusion protection services, application filtering, identity services and encryption. VM block 588 includes exemplary services such as encryption, WLAN controller, voice controller, identity services and unified communications. VM block 590 executes the same services as VM block 588. VM block 592 includes just encryption services. VM block 592 only needs to perform encryption services as the edge switches 542, 552, 554 and 512 and the like have performed the services more appropriate to be done at the edge. VM block 594 associated with the core switches 504 includes services such as encryption, VPN and unified communications. From viewing FIG. 6, it can be readily seen that the relevant services are deployed as needed depending upon the layout of the particular network. In general the services are deployed at the particular first point of use, not at a point later in network which might require routing and rerouting packets.

Figure 7:
FIGS. 7 and 8 are screen captures of a graphical user interface for managing a network of FIG. 5 and distributing services software.
Figure 8:

The above virtual machine network services environment provides very flexible operations but will be difficult to administer without proper tools. Because there are conventionally a very large number of switches, such as edge, core, and aggregate, in a typical enterprise and they are widely distributed, a convenient network management tool is necessary. In the preferred embodiment a management station 606 includes a management tool 608 which is provided to enable a customer to buy virtual machine services from an online store provided by a web server 604, shown in a web server network boo and connected using switch 602 to core switches 504, and link the services to rules that govern the data traffic flow through the customer's network. This tool 608 allows purchase of desired network services from the online store from a web browser interface. The tool 608 has knowledge of the revision levels of existing network services already present on the customer's network by use of a deployments table 614 and, therefore, is able to indicate to the customer appropriate update revisions available from the online store. In addition to new network services not present on the customer's network, the online store also automatically indicates other associated products for each service, such as professional and technical support services, and education materials. Further, the online store offers both products and services from the online store owner and the owner's partners. The tool 608 can also link to license management software 610 in case the customer has bulk licensing terms for selected software, allowing use of an existing, available license if one is present, as might happen if services are being migrated around the network as needed. FIGS. 7 and 8 illustrate an exemplary browser interface 700. A function pane 702 is provided to allow selection of the desired management function, as seen in the list in function pane 702. In the example of FIGS. 7 and 8, the selected function is the vNet Store, the example online store. A network services pane 704 lists the various network services available for purchase by the customer. The vNet Store will behave as a conventional online store, allowing selection and checkout. Delivery of the selected network service software will preferably be handled in an online manner, with both distribution of the software and any necessary keys handled by the store and the tool 608.

Figure 9:
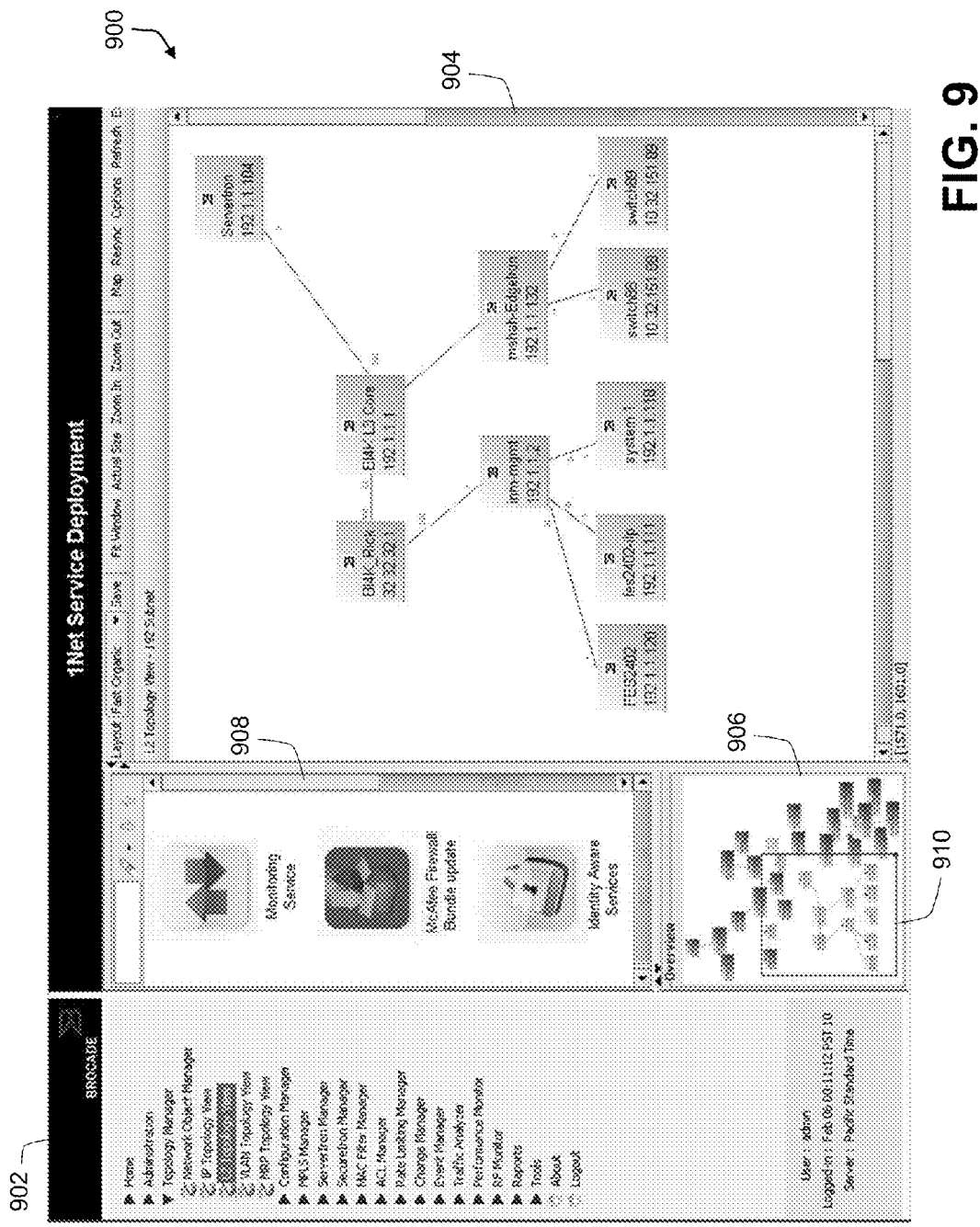
FIG. 9 is a view of the graphical user interface illustrating services software and a topology view of an exemplary network.

After various network services have been obtained, deployment of the network services is preferably done using a drag and drop operation. FIG. 9 illustrates a screenshot 900 of the application. A function pane 902 is provided, essentially the function pane 702 but with a L2 Topology View selected rather than the vNet Store. This results in three different panes appearing. The first pane is a working topology pane 904. An overview topology pane 906 is provided to allow the pane 904 to be placed in context of the entire network. The area 910 is the topology portion displayed in pane 904. A network services pane 908 is provided and lists the various services that may be deployed.

Figure 10:
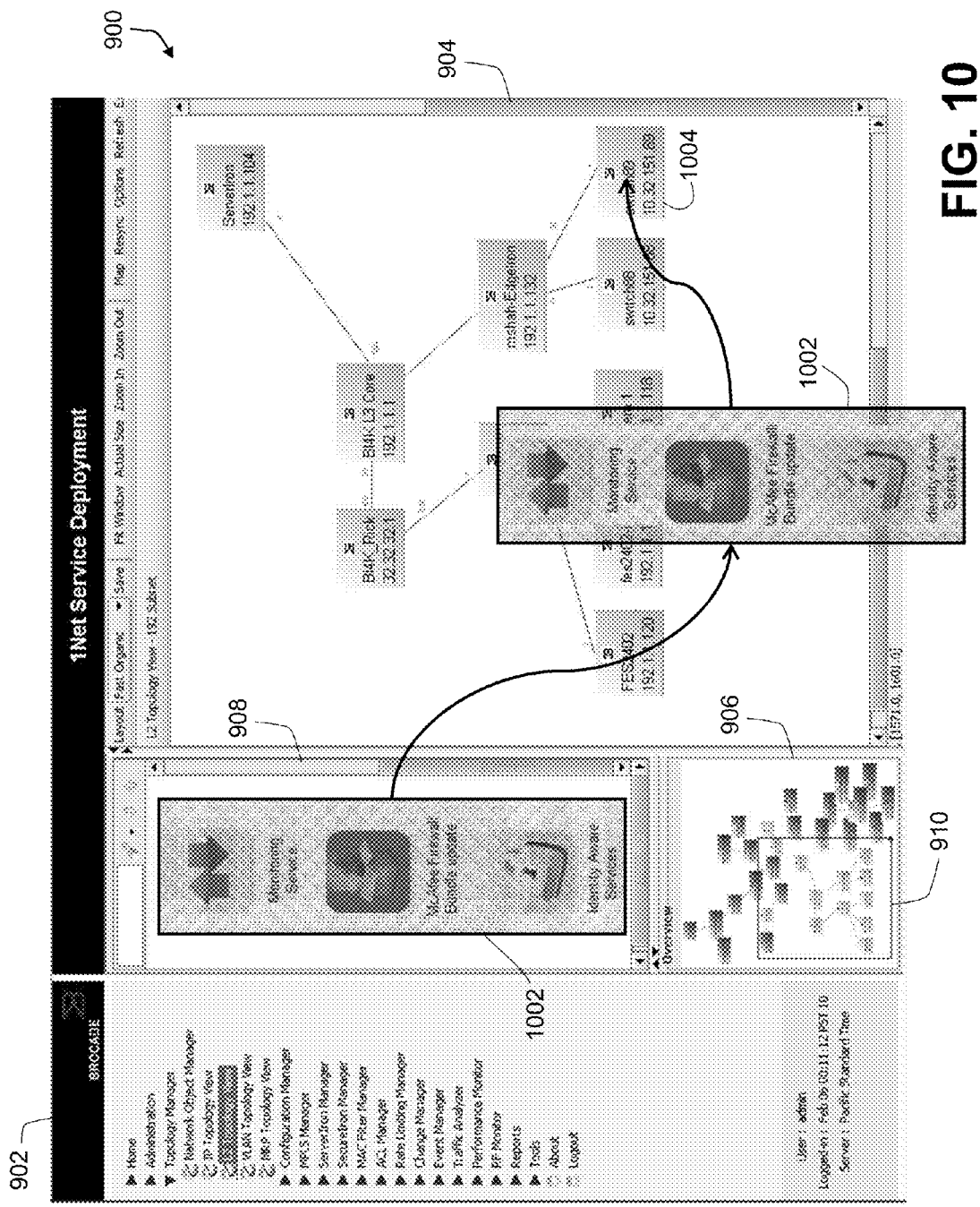
FIG. 10 illustrates the drag-and-drop of selected software services to a switch according to the present invention.

In FIG. 10, a set of services 1002 has been selected for deployment to switch 1004. The selected set of services 1002 is dragged from the pane 908 to over the switch 1004 and dropped. This causes the tool 608 to obtain local copies of the network services 616 and deploy the selected services to the switch 1004. New virtual machines are instantiated to execute the new services. Copies of the services software is provided to the switch 1004 by the tool 608. Once the copies are loaded and the virtual machines configured, the virtual machines are started and the execution of the services begins. Any necessary changes to other switches in the network due to the installation of the new services is also made. For example, all edge switches receive an indication of the new service and its intended use to allow the packet processors to properly insert any services tag information relating to the new services.

Figure 11:
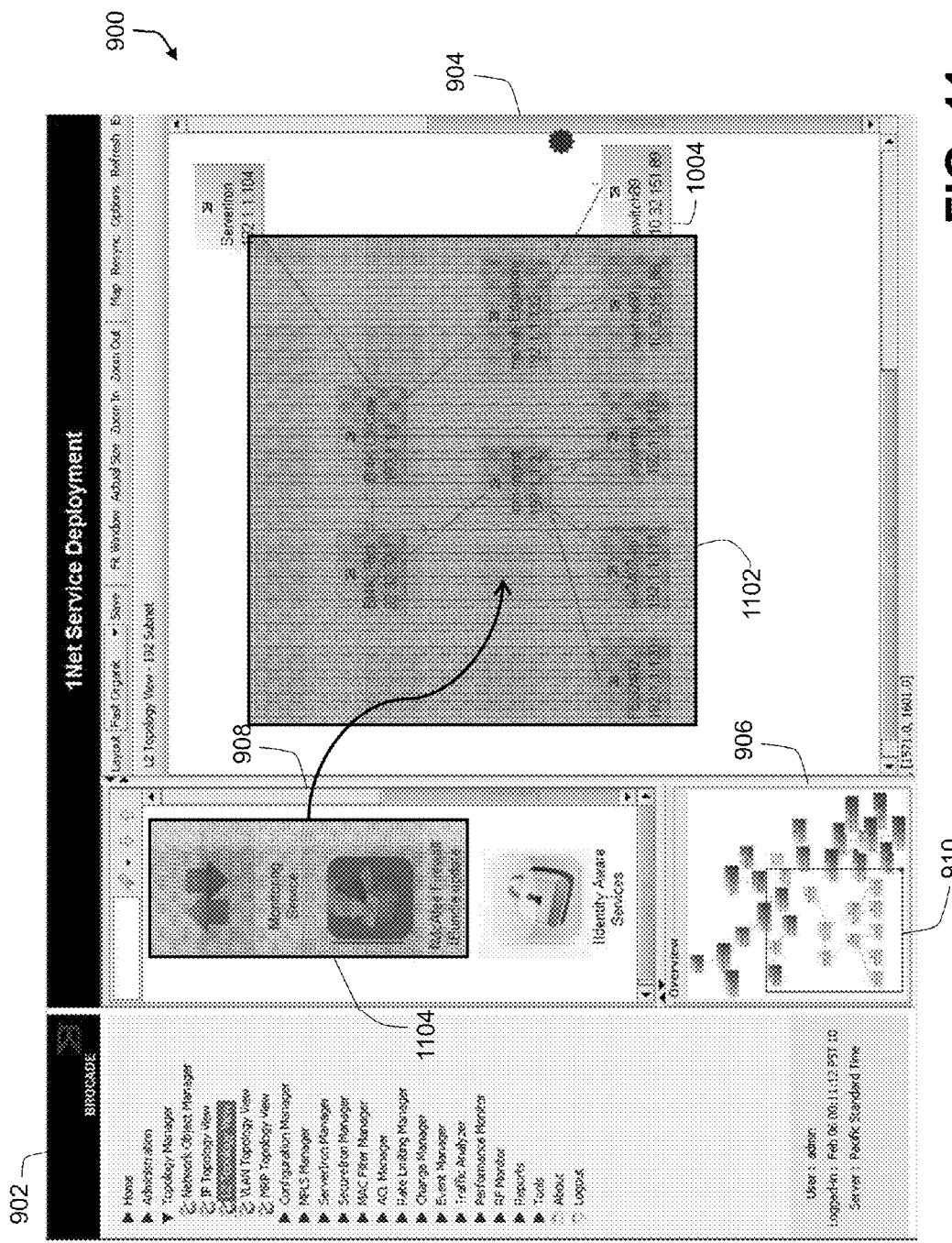
FIG. 11 illustrates the distribution of selected software services to a plurality of selected switches according to the present invention.
Figure 12:
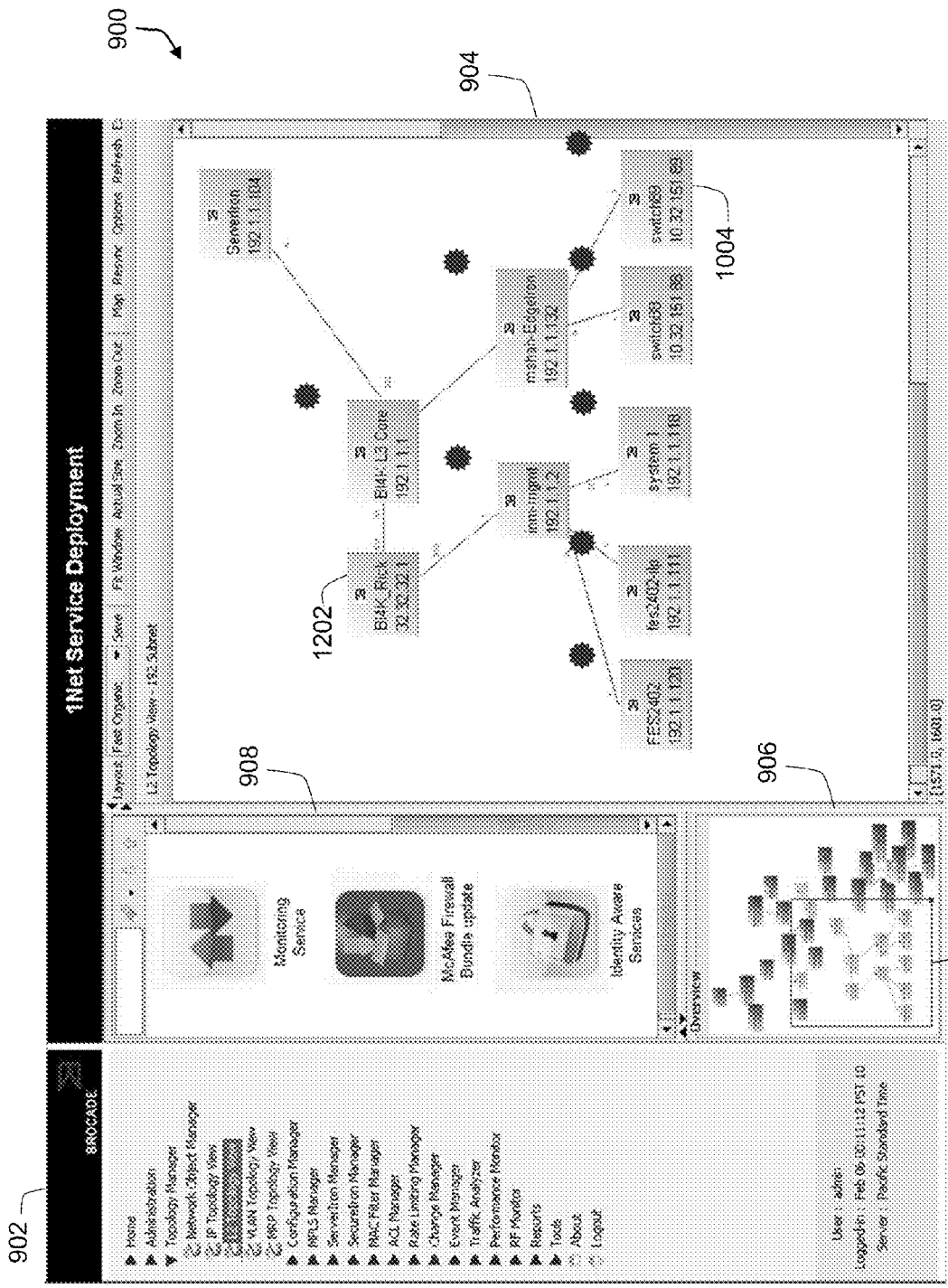
FIG. 12 illustrates the deployment indications of the selected services according to the present invention.

FIG. 11 depicts provisioning or deployment to multiple switches at one time. A group of switches is selected in the box 1102. The cursor is moved to the services pane 908 and the desired services are selected, as in the box 1104. The selected services are then dragged over the box 1102 of the selected switches and dropped. This causes the tool 608 to deploy the services to multiple switches with one simple operation. FIG. 11 also shows a star over switch 1004. This symbol is used to indicate that network services have been successfully deployed in this session. FIG. 12 is the result after the deployment done in FIG. 11. It is noted that switch 1202 does not have a star, even though it was included in the selected set 1102. This indicates that none of the network services selected (set 1104) was appropriate to execute on switch 1202 and thus were not deployed to that switch 1202.

The management tool 608 enables the customer to link their purchased services to network policy 612 where network policy is defined as the set of rules applied to specific data flows on the customer's network. Moreover, this policy 612 can include specifying rules and services to network context. Network context is defined as the state of the data flow on the network where state consists of the data flow's end-user entity and functional role in the enterprise, and the priority of the data flow relative to other flows that may enter the network. This linkage of network services to network policy is referred to as binding network services to network context. After the customer uses the tool 608 to bind services to network policy 612, the management tool 608 then selects the proper software and provides it to the indicated switch, which includes the relevant tools to allow the creation and execution of the new virtual machine for the newly provided service.

Thus the use of the topology view in conjunction with a services pane and drag and drop operation provides a very simple method to deploy the services to single or multiple switches.

Figure 13:
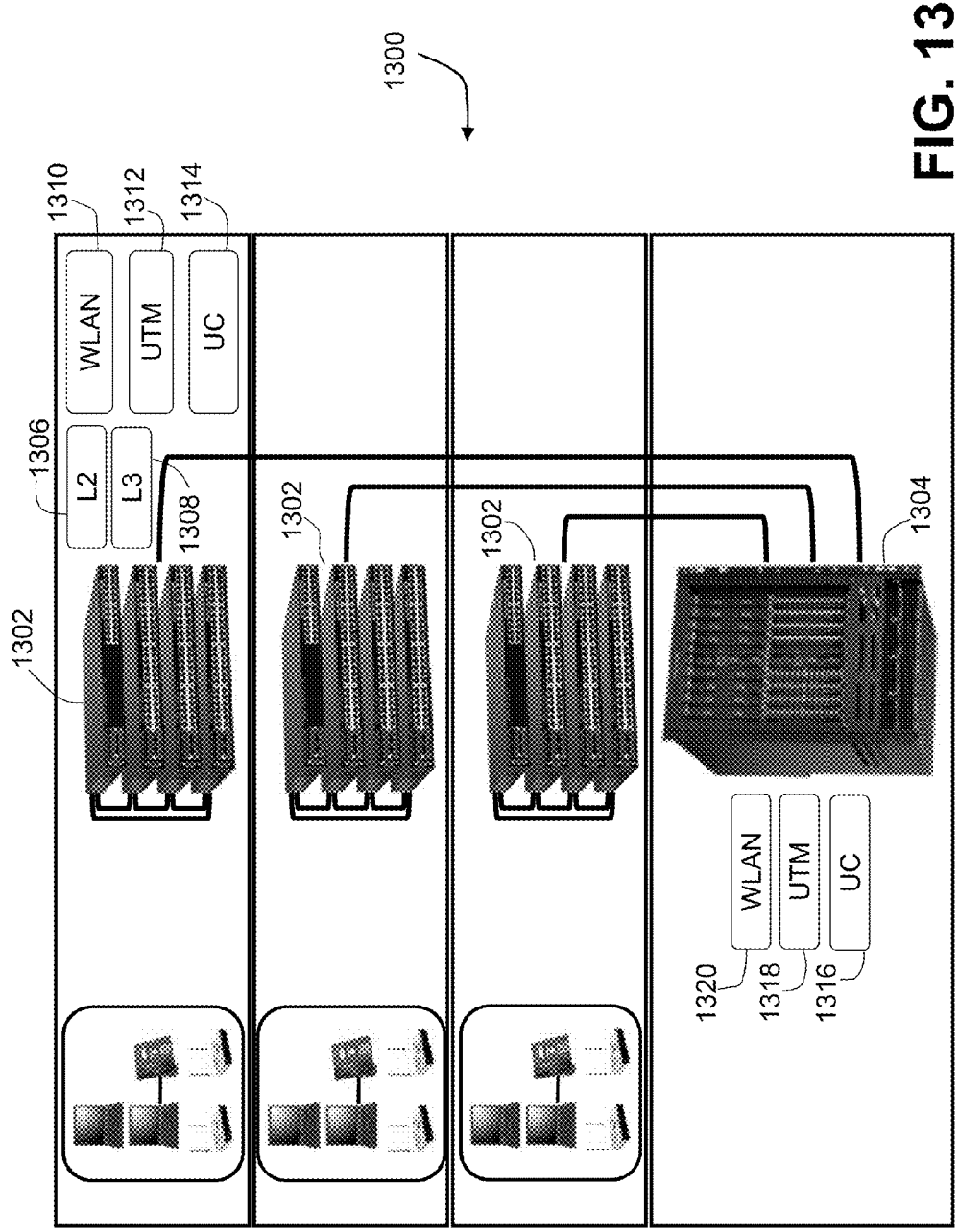
FIG. 13 is an alternate block diagram of a series of connected switches with various distributed services according to the present invention.
Figure 14:
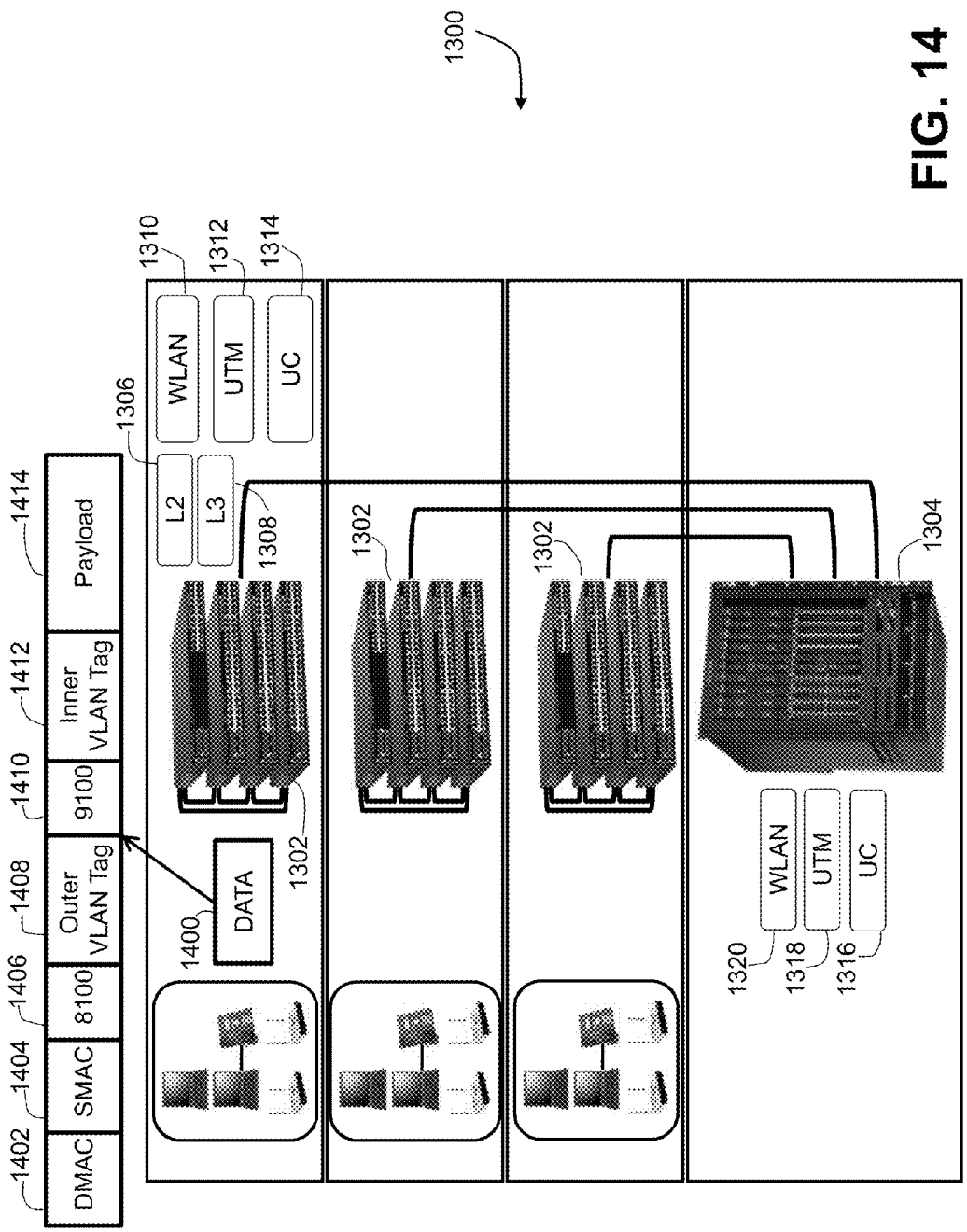
FIG. 14 illustrates data to be transmitted through the network of FIG. 13.

FIG. 13 provides a network 1300 with edge switches 1302 connected to a core switch 1304. The edge switches perform L2 routing 1306, L3 routing 1308, WLAN network services 1310, unified threat management services 1312 and unified communications services 1314. The core switch 1304 performs WLAN services 1320, unified threat management services 1318 and unified communications services 1316. FIG. 14 adds a data packet 1400, which is transmitted from one of the attached computers to the edge switch 1302. The data packet 1400 has various portions, broken out above. The data packet includes a destination MAC address 1402, a source MAC address 1404, a tag protocol identifier 8100 1406 for the outer VLAN tag 1408, a tag protocol identifier 9100 1410 for the inner VLAN tag 1412 and the payload 1414.

Figure 15:
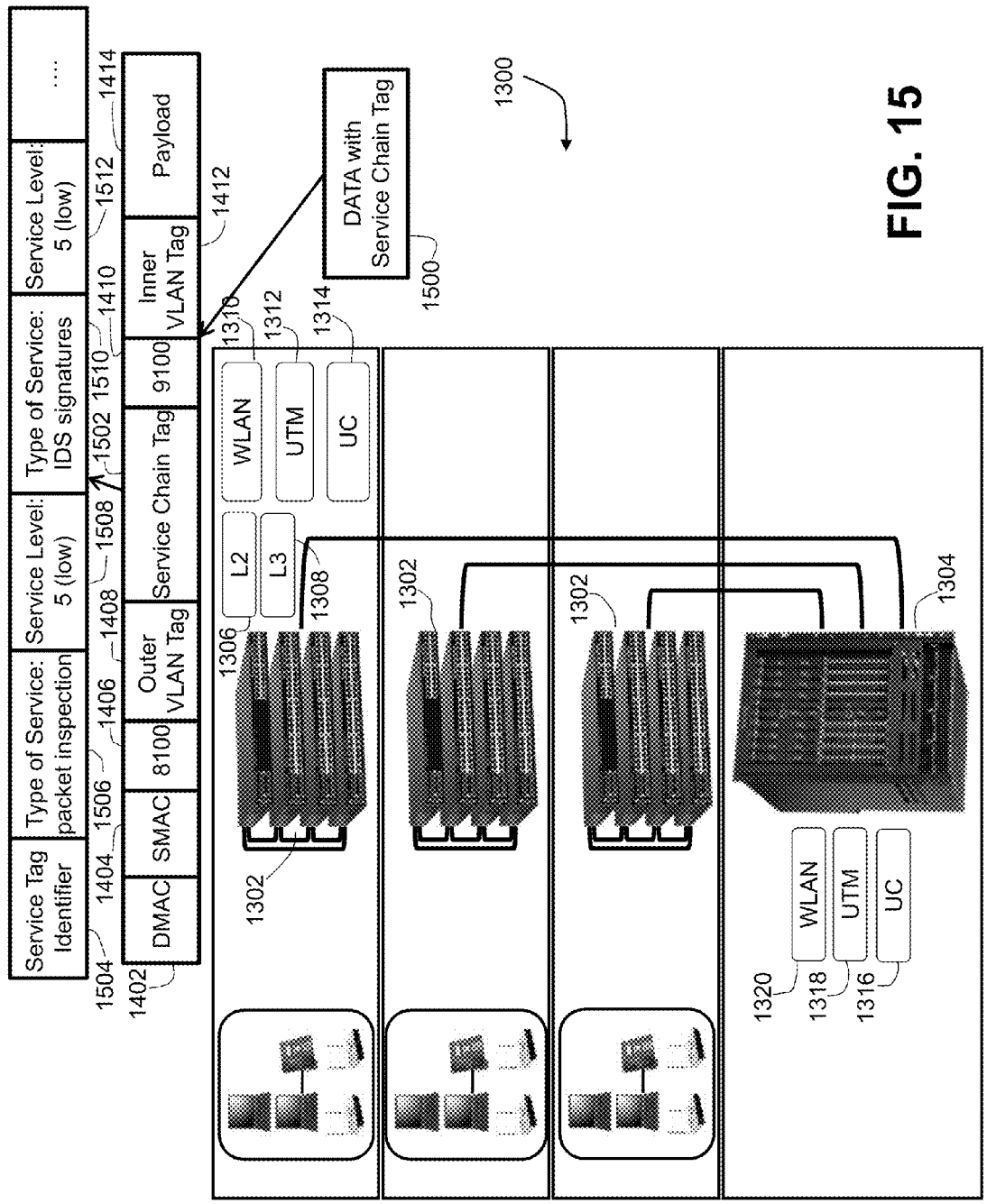
FIG. 15 illustrates the data provided in FIG. 14 after operation by switches with the selected services according to the present invention.

FIG. 15 has the data packet 1400 after processing by the packet processor of the edge switch 1302. The data packet 1500 is the data packet 1400 with a service chain tag added to the packet as illustrated. In the preferred embodiment the service chain tag 1502 is added between the VLAN tags 1408 and 1412, but other locations are possible. The service chain tag 1502 is a series of service indications. The service chain tag 1502 starts with a service tag identifier 1504. Then follows a series of services entries, with only two illustrated. A services entry starts with the type of service 1506 and ends with a service level field 1508. The second services entry follows, with a type of service field 1510 and service level field 1512 for the second service is shown. Other services entries would follow until all needed services have been indicated.

Figure 16:
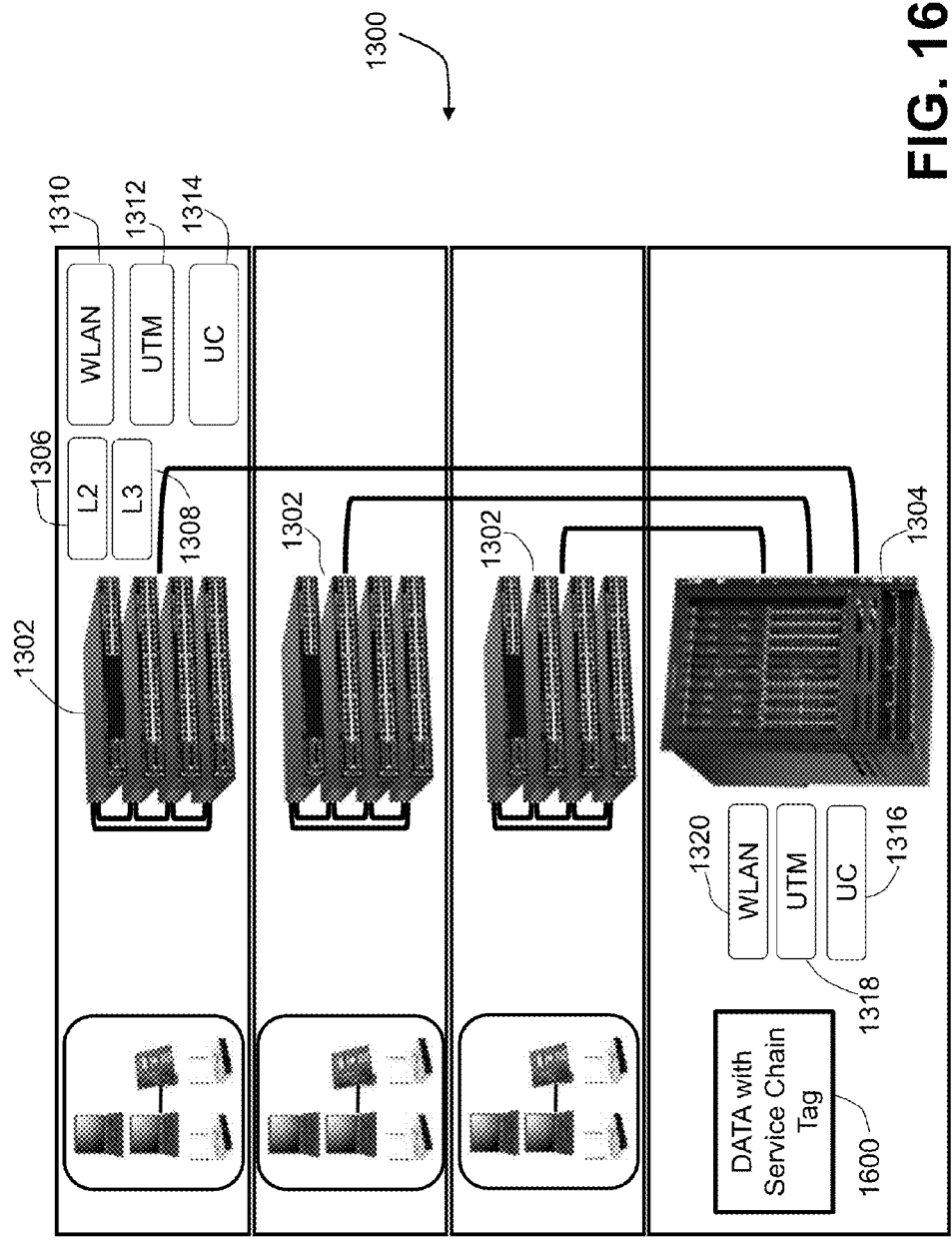
FIG. 16 illustrates the data of FIG. 15 being received at the core switch of FIG. 13.
Figure 17:
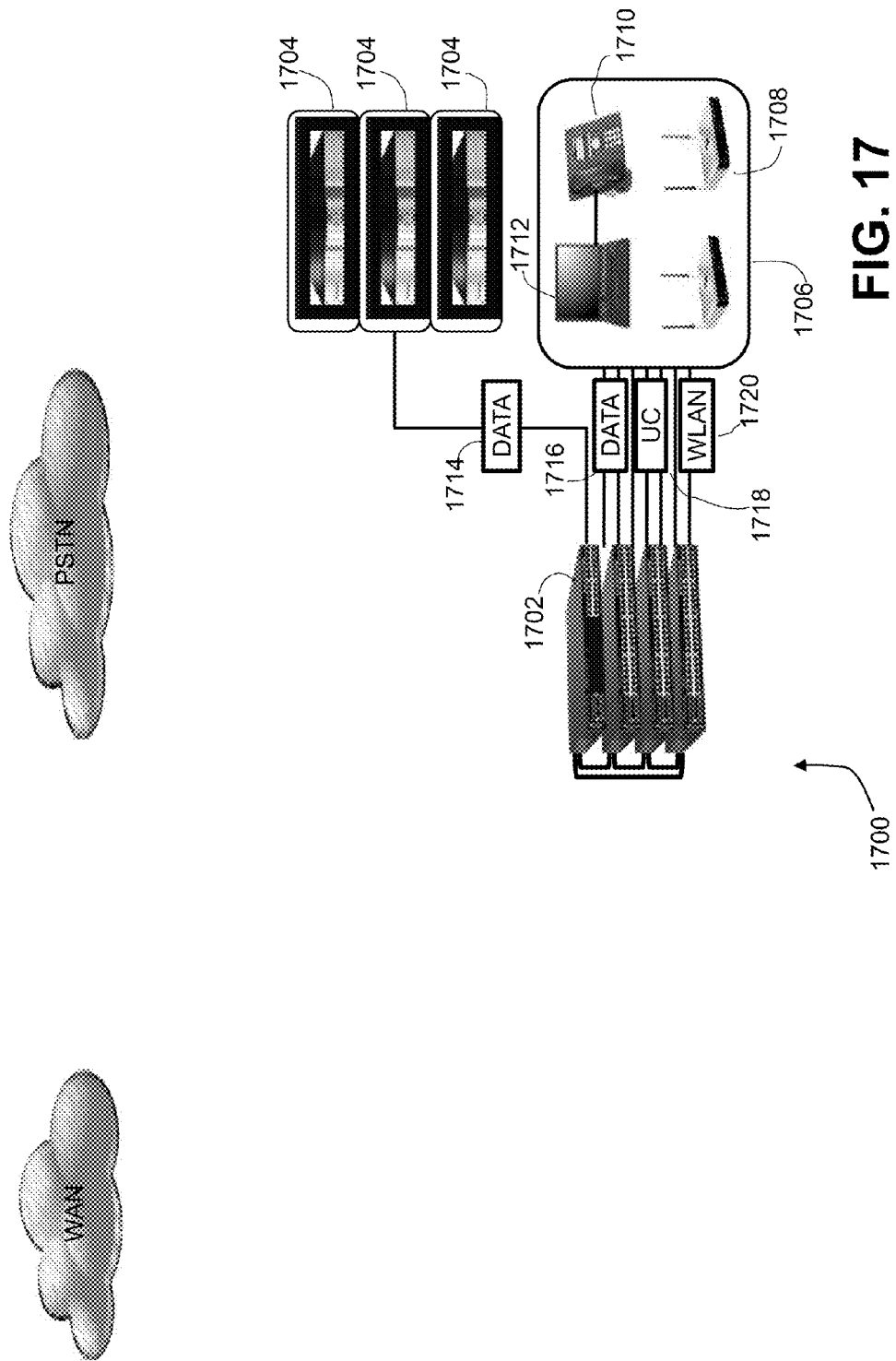
FIG. 17 is a diagram illustrating a more complex data flow through a network from various devices according to the present invention.
Figure 18:
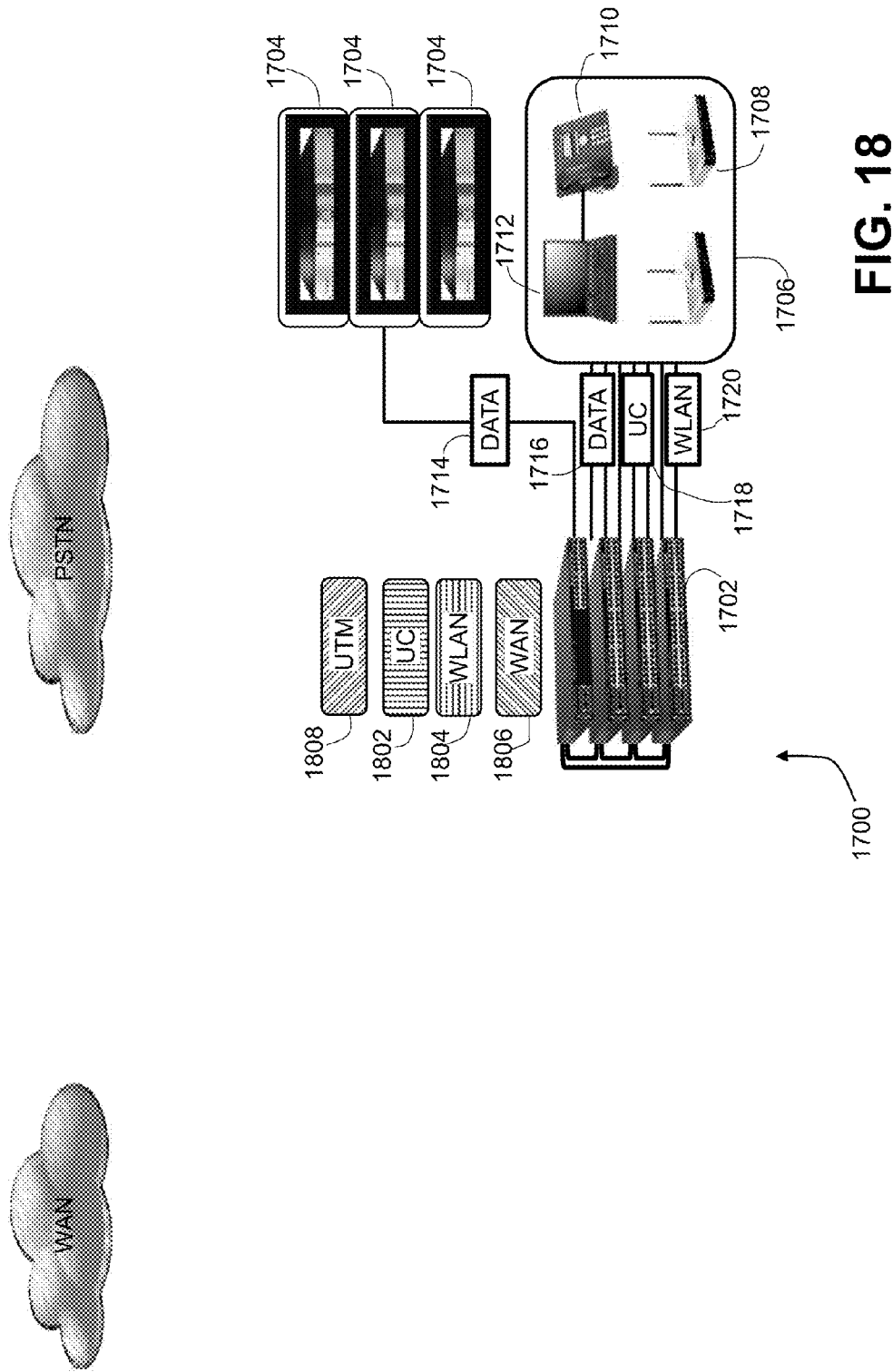
FIG. 18 is the block diagram of FIG. 17 with the necessary services to be deployed according to the present invention.

FIG. 16 illustrates the data packet at the core switch 1304. The data packet 1600 is the data packet 1500 with any services entries relating to services performed by the edge switch 1302 removed, leaving just services to be performed by the core switch 1304. The core switch 1304 would perform the appropriate services and route the data packet 1600, with any performed services entries removed, to the next destination.

Figure 19:
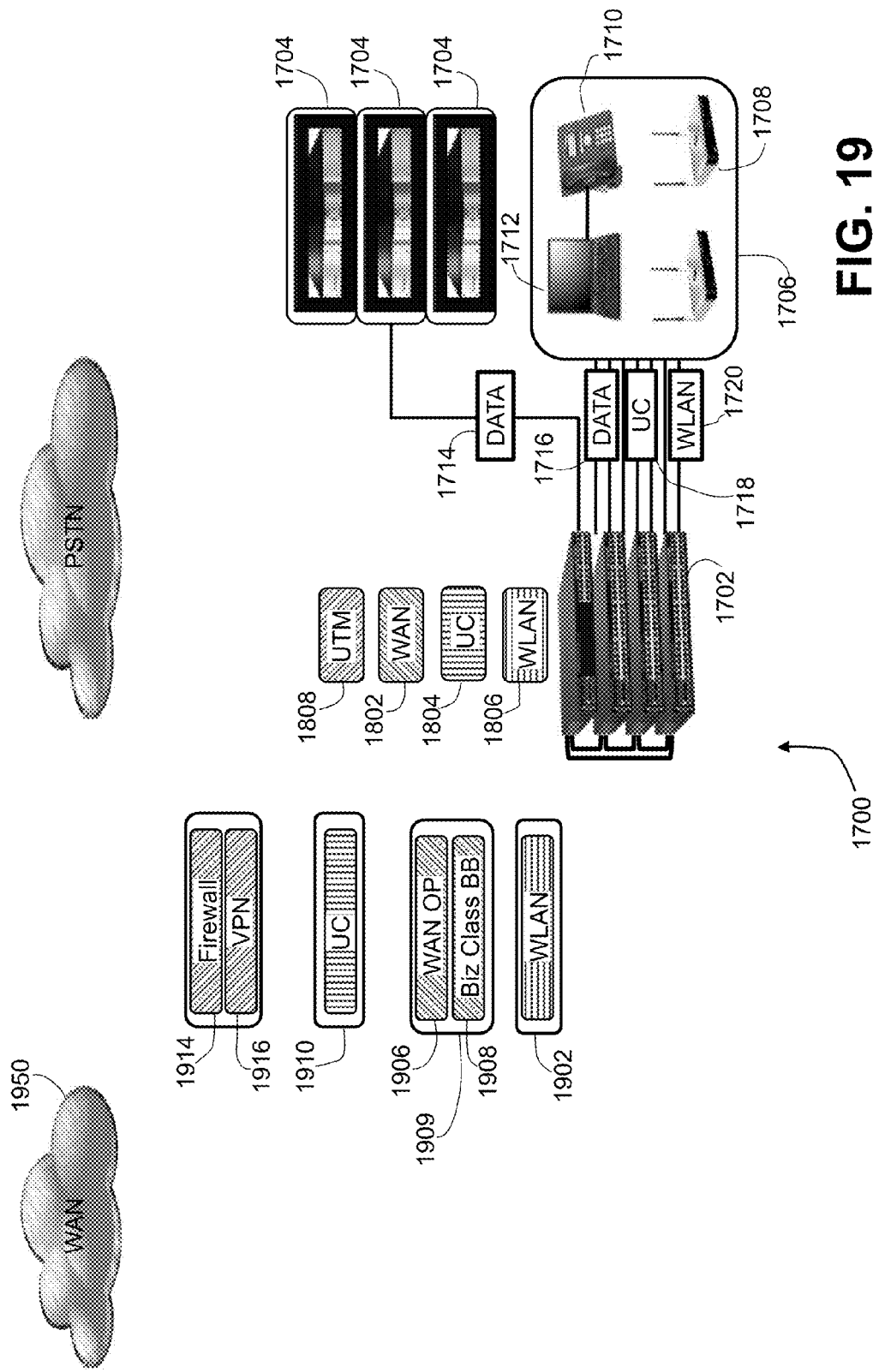
FIG. 19 is a further breakdown of the services of FIG. 18 into individual components.
Figure 20:
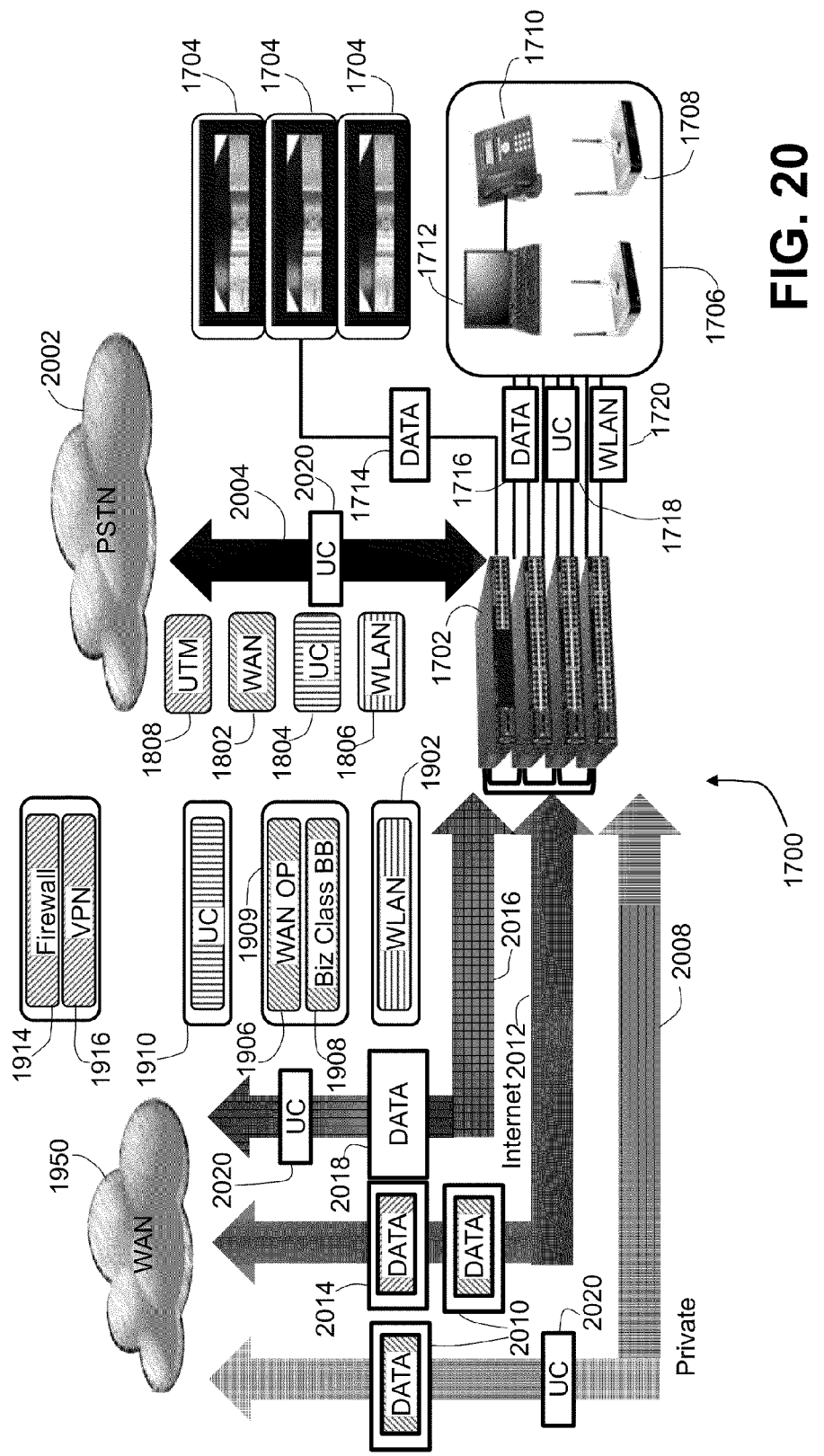
FIG. 20 illustrates the full dataflow from FIG. 19 to the various network interfaces according to the present invention.

FIGS. 17-20 are an alternate representation of operations according to the present invention. A network 1700 includes a series of switches 1702. A series of servers 1704 are connected to the switches 1702 and transfer data 1714. Devices 1706, such as wireless access points 1708, computers 1712 and phones 1710 are connected to the switches 1702 and provide data packets 1716, unified communications packets 1718 and WLAN data packets 1720. Four basic services, unified communications 1802, WLAN 1804, WAN 1806 and unified threat management 1808 are running on the switches 1702. These services break out as illustrated in FIG. 19. Services with a dark ring around them are operational with the traffic illustrated in FIG. 19. The WLAN service 1902 operates on the WLAN data 1720. The unified communications service 1802 breaks out the unified communication service 1910 and operates on the unified communications packets 1718. The WAN service 1909 breaks out to WAN optimization service 1906 and business class broadband service 1908, used primarily for WAN link aggregation, and they operate on operates on data packets 1714 and 1716 directed to the WAN 1950. Unified threat management is handled by VPN services 1916 and firewall services 1914, though it is understood that other specific services are common in UTM operations. FIG. 20 illustrates the data flow after the switches 1702 have performed the services. A private link 2008 is developed to transfer data 2010 and unified communication data 2020 over the WAN 1950. Internet connections 2012 and 2016 carry WAN data 2010, VPN data 2014, unified communication data 2020 and normal data 2018, respectively. A PSTN link 2004 connects to the PSTN network 2002 to carry unified communications data 2020.

Figure 21:
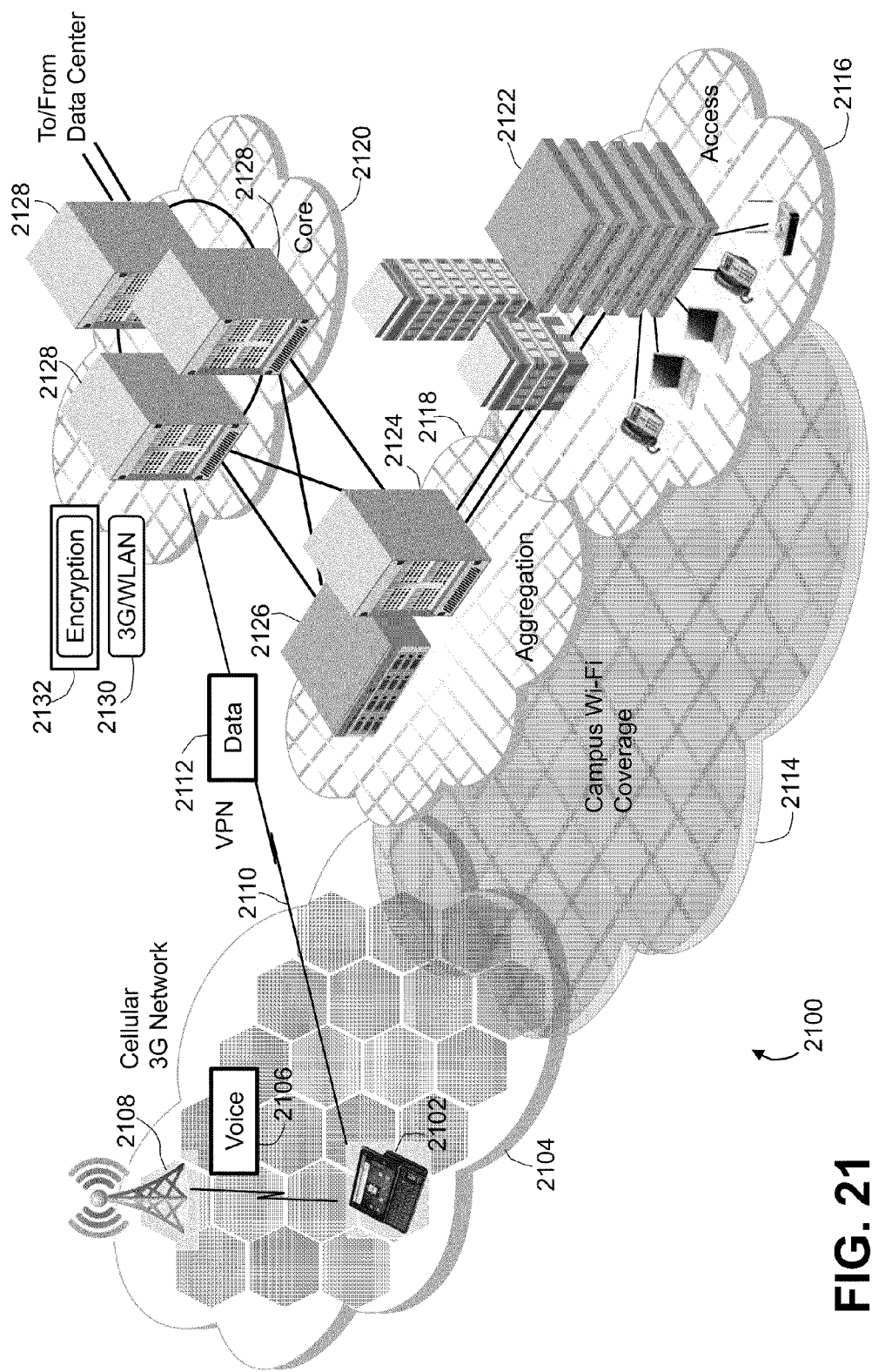
FIG. 21 illustrates an exemplary enterprise network including cellular connectivity for illustration of data flows and services deployment according to the present invention.
Figure 22:
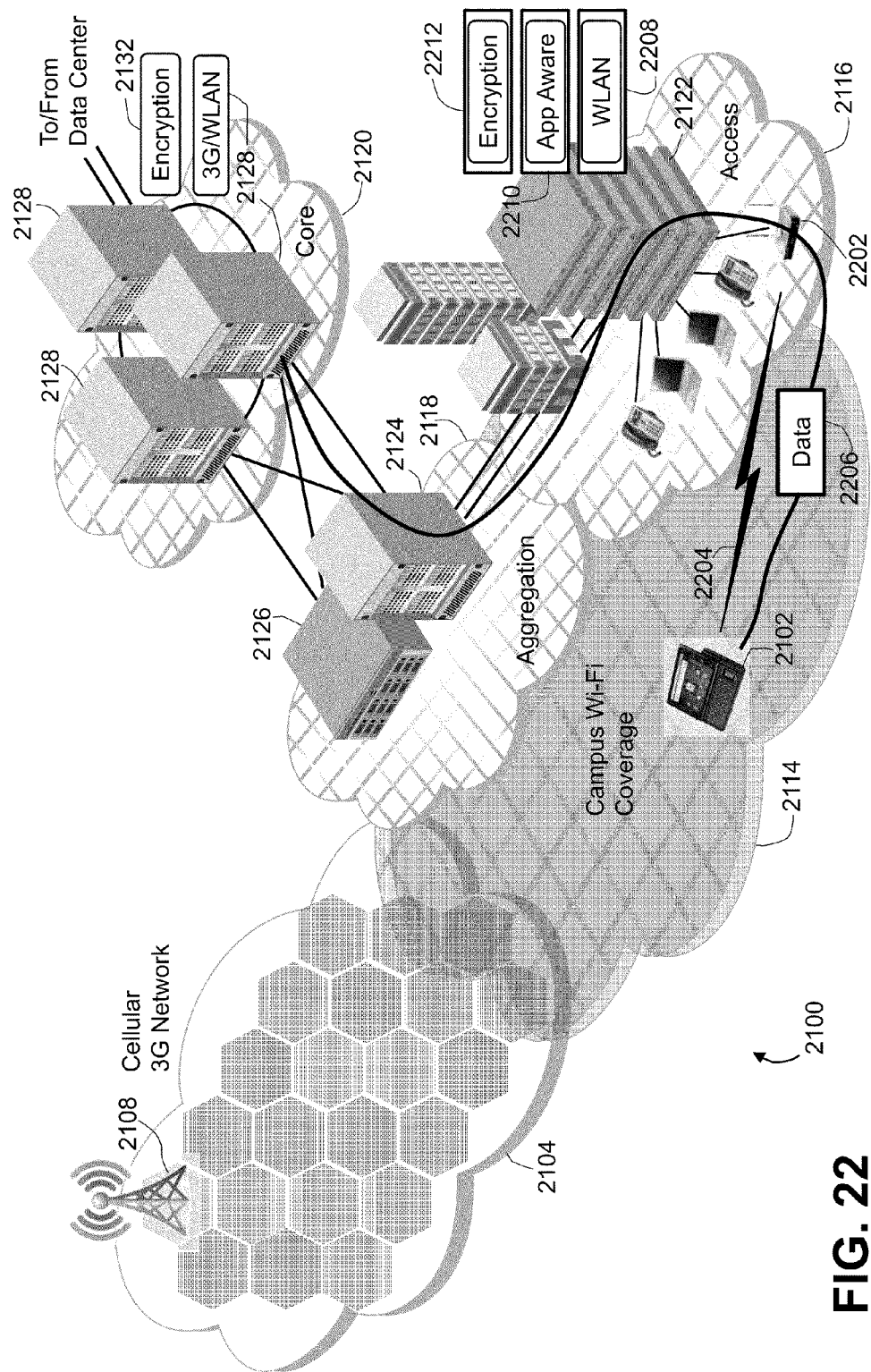
FIG. 22 illustrates the dataflow in the WiFi coverage area of FIG. 21 according to the present invention.
Figure 23:
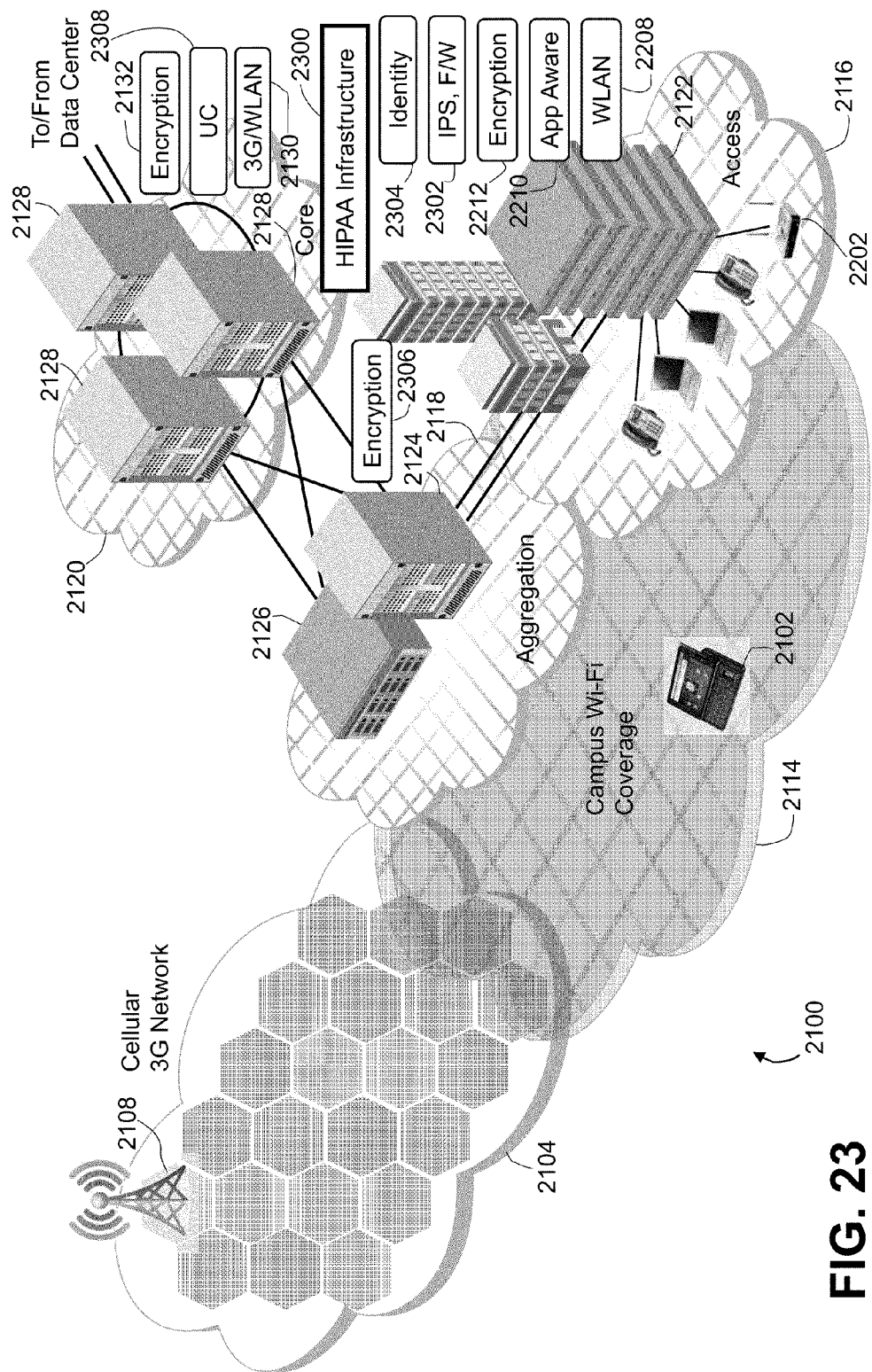
FIG. 23 indicates illustrates the services deployment for a HIPAA infrastructure for the network of FIG. 21 according to the present invention.
Figure 24:
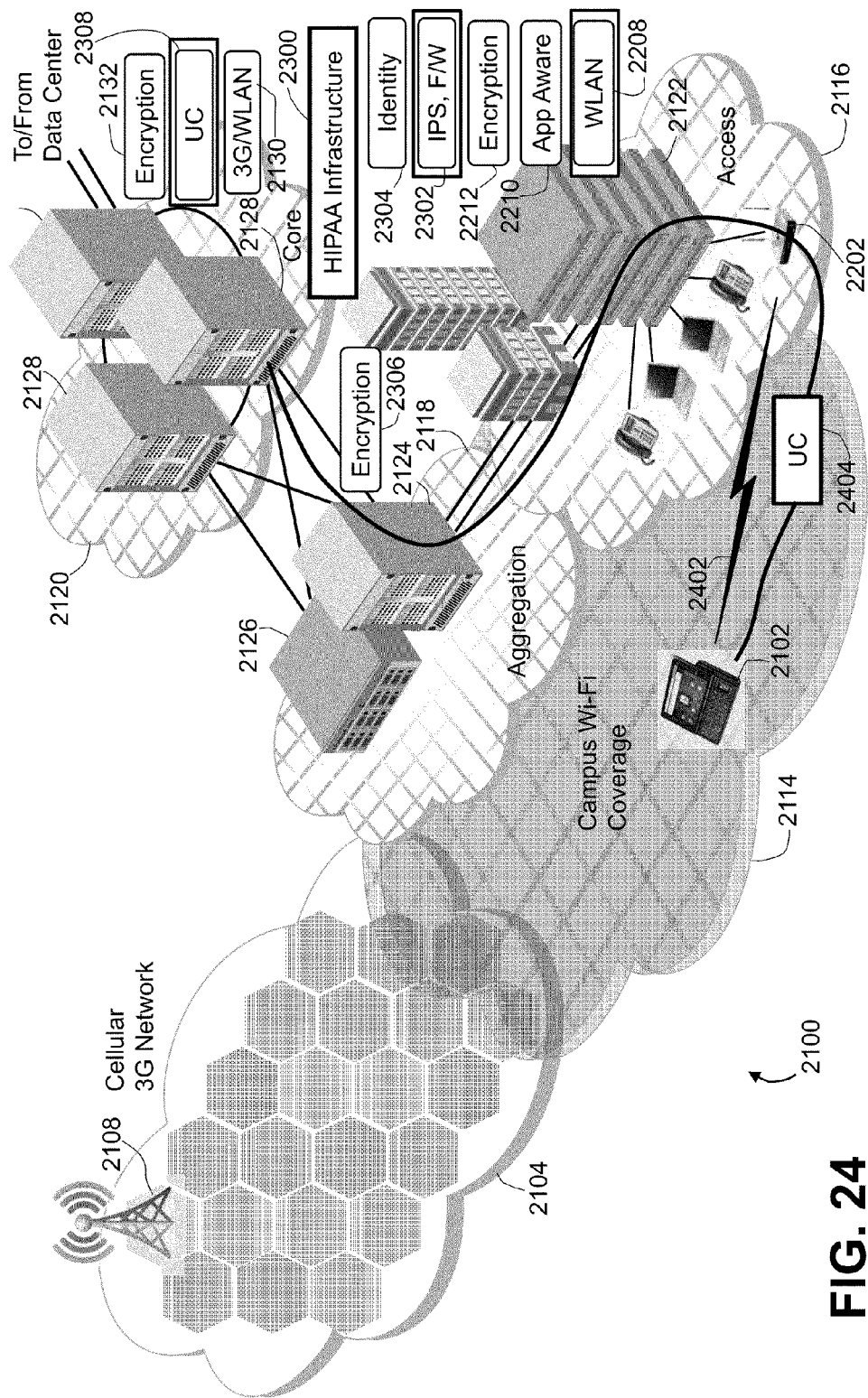
FIG. 24 illustrates the active services for unified communication data flow through the network of FIG. 23.
Figure 25:
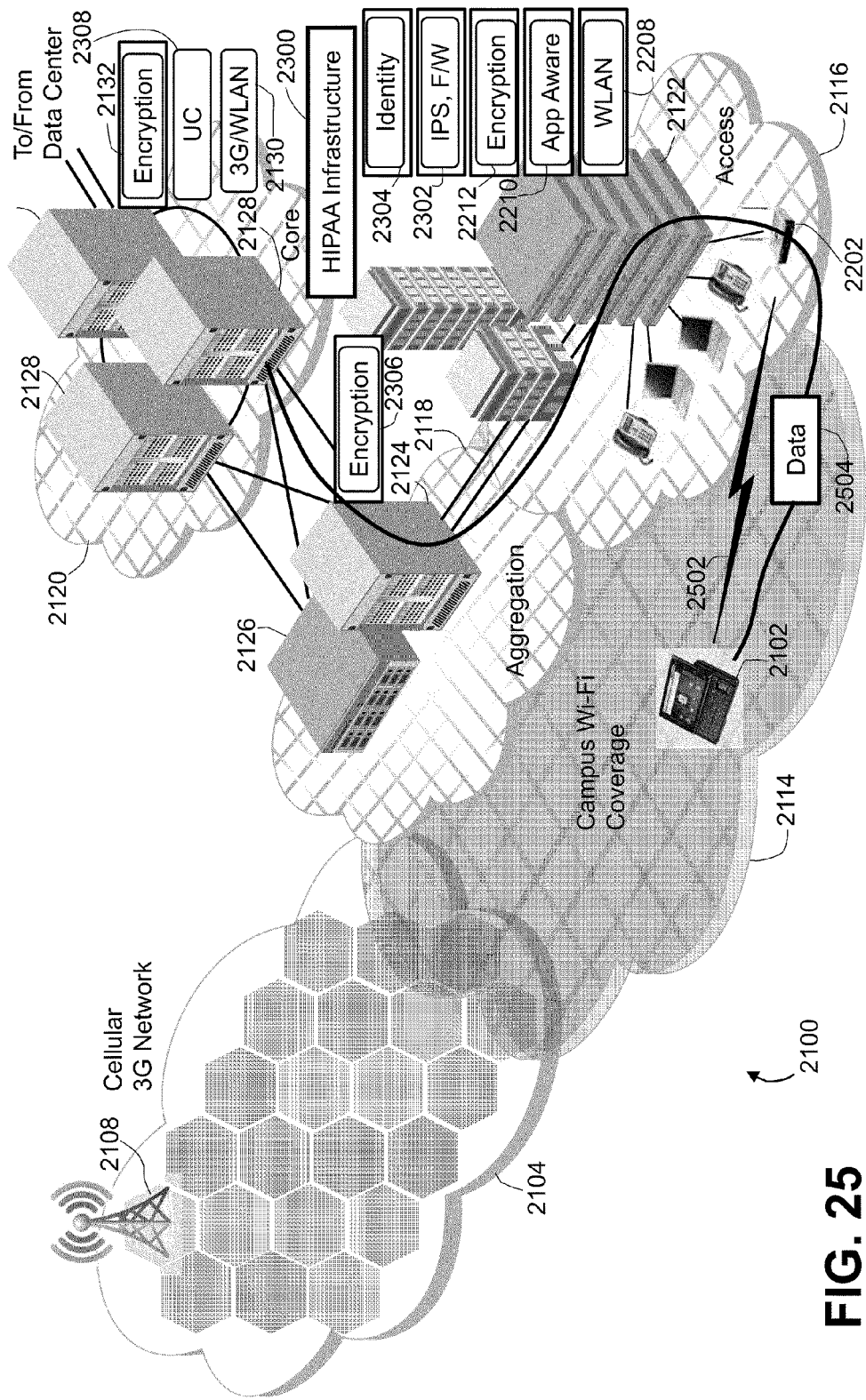
FIG. 25 illustrates the active services for a data transfer for the network of FIG. 23.

FIGS. 21-25 provide a last example of the operation of the deployed services in virtual machines in appropriate switches in a network. In the illustrated environment, a smartphone with cellular and WiFi capability is used as the data access device, with the smartphone moving from the 3G cellular network to the campus WiFi network. FIGS. 23-25 illustrate operations when a secure environment, such as those dictated by HIPAA (Health Insurance Portability and Accountability Act of 1996), is utilized, while FIGS. 21 and 22 are a less secure environment.

A smartphone 2102 is operating in an environment 2100. The smartphone 2102 is connected via a cellular network 2104. Voice packets 2106 are transferred normally to a cellular base station 2108. A VPN 2110 is established to carry data packets 2112 to the enterprise network. The enterprise network includes a campus WiFi coverage area 2114 from a campus access network 2116. The campus access network 2116 is connected by switches 2122 to an aggregation network 2118 and its switches 2124 and 2126. The aggregation network 2118 is connected to a core network 2120 and its core switches 2128. The core switches 2128 are operating encryption services 2132 for the VPN link 2110. Thus the smartphone 2102 is communicating with the core switches 2128 over the VPN 2110 with the core switches handling the VPN service. The core switches 2128 also would execute the 3G/WLAN services 2130, but those are used only for handoff between the 3G cellular network 2104 and the WiFi network 2114. Because such an example is not shown, the 3G/WLAN services 2130 are not shown as active in the Figures.

In FIG. 22 the smartphone 2102 has entered the campus WiFi coverage area 2114 and is performing data transfer operations. A wireless access point 2202 establishes a connection 2204 with the smartphone 2102 to transfer data 2206. The switches 2122 execute WLAN services 2208, application aware services 2210 and encryption services 2212. The data packet 2206 travels to the core switches 2128, which have the encryption services 2132 and 3G/WLAN services 2130 installed but they do not operate on the data packet 2206, as indicated by not having an outer rectangle.

In FIG. 23 a HIPAA environment 2300 is shown. Intrusion protection and firewall services 2302 and identity services 2304 are added to the switches 2122. Encryption services 2306 are added to the switches 2124 and 2126. Unified communication services 2308 are added to the core switches 2128. In FIG. 24 the smartphone 2102 is making a unified communications call. The smartphone 2102 is connected 2402 to the wireless access point 2202 to provide unified communications data 2404. The WLAN services 2208 and intrusion protection and firewall services 2302 are active on the switches 2122 and the unified communications services 2308 are active on the core switches 2128. In FIG. 25 the smartphone 2102 is transferring data packets 2504 over a link 2502 to the wireless access point 2202. All of the services on switches 2122 are active, with encryption services 2306 on the switches 2124 and 2126 and encryption services 2132 on the core switches 2128 active. Therefore the change in data type from the same source device has necessitated changes in the operational services for those packets. The packet processors in the edge switches provide the additional services entries into the services tag based on the particular data type.

Because the services that can be provided by the virtual machines are similar to those that would be run in many cases on a conventional computer or server hooked up to the network as an appliance, the use of virtual machines in the switches allows incorporation of not only proprietary network service modules but third-party modules which are intended to run on conventional personal computer hardware. This further improves the flexibility of the switches and allows additional appliances and devices to be removed from the network.

In addition, the provision of virtual machines in the various switches allows the network services to be deployed to the best locations for their operation and simplify internal routing as special routing is not required to occur, as would normally happen with dedicated appliances.

In addition, the virtual machine deployment in switches need not only occur in the enterprise but it can also be deployed with great advantage to branch offices. Instead of an administrator having to make a choice between spending large amounts of money for dedicated appliances, which might be overly expensive for a given branch office, or foregoing the services, a virtual machine can be deployed to the switch in the branch office. The branch office switch processor is underutilized in most situations anyway, so the extra processing capability can be readily utilized without requiring a more powerful or more expensive switch or the addition of numerous dedicated appliances.

The deployment of the virtual machines into the various switches which are the entry points into the network is also highly advantageous in a highly mobile environment where connected devices may go from a cellular network, connecting to a VPN, and move into a WiFi or wireless area network environment of the enterprise. Because the required pieces are preferably deployed in the relevant switches where the initial packets are going to be received, additional routing is not required and security and the like can be readily handled to satisfactory levels such as that required by each HIPAA and the like.

It is further understood that exemplary network services and exemplary relevant execution locations are described. Many other network services can be deployed and the network services can be executed where optimal for a given network. It is also understood that while switches have been described, other networking devices such as routers and the like can operate as described. In other embodiments a dedicated appliance may be used in conjunction with the services chain tag provided by the edge switches, with the dedicated appliance executing the virtual machines and network services. This allows multiple services to be performed in one appliance, at least limiting the number of potential network hops needed for full processing of a frame. It is further understood that the Ethernet environment is the preferred environment but other network protocols can be operated as described according to the present invention. It is even further understood that the management and deployment tool run be multiple modules running on one or separate computers and that various of the features, such as license management, can be omitted or additional features can be added. It is also understood that alternative GUI operations can be utilized.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A network comprising:
a plurality of interconnected network switches, wherein the network switches are interconnected in a topology having at least two tiers and wherein at least a first number of said plurality of interconnected network switches execute network services in addition to performing switching functions; and
a management tool coupled to said plurality of interconnected network switches to deploy network services to said plurality of interconnected network switches,
wherein said network services include network services appropriate for different tiers and for different connection configurations, and
wherein said management tool deploys said network services to appropriate of said plurality of interconnected network switches based on the tier of the network switch, the topology of the network and the location of the network switch in the topology.

2. The network of claim 1, wherein the topology includes a first tier being an edge tier and a second tier being a core tier.

3. The network of claim 1, wherein said network services includes a wireless network access service, and
wherein said wireless access service is deployed to any network switches which may be connected to wireless access points.

4. The network of claim 1, wherein said network services includes an identity service, and
wherein said identity service is deployed to any network switches which form an edge of the network.

5. The network of claim 1, wherein said network services includes an encryption service, and
wherein said encryption service is deployed to any network switches which must communicate securely to an attached device.

6. A method comprising:
interconnecting a plurality of network switches, wherein the network switches are interconnected in a topology having at least two tiers and wherein at least a first number of said plurality of network switches execute network services in addition to performing switching functions; and
deploying, by a management tool, network services to said plurality of interconnected network switches,
wherein said network services include network services appropriate for different tiers and for different connection configurations, and
wherein deployment of said network services is to appropriate of said plurality of interconnected network switches based on the tier of the network switch, the topology of the network and the location of the network switch in said topology.

7. The method of claim 6, wherein the topology includes a first tier being an edge tier and a second tier being a core tier.

8. The method of claim 6, wherein said network services includes a wireless network access service, and
wherein said wireless access service is deployed to any network switches which may be connected to wireless access points.

9. The method of claim 6, wherein said network services includes an identity service, and
wherein said identity service is deployed to any network switches which form an edge of the network.

10. The method of claim 6, wherein said network services includes an encryption service, and
wherein said encryption service is deployed to any network switches which must communicate securely to an attached device.

* * * * *